US011412571B2

(12) United States Patent
Gao et al.

(10) Patent No.: US 11,412,571 B2
(45) Date of Patent: Aug. 9, 2022

(54) COMMUNICATION METHOD AND COMMUNICATIONS APPARATUS TO DELIVER FIRST DATA TO AN UPPER LAYER

(71) Applicant: HUAWEI TECHNOLOGIES CO., LTD., Guangdong (CN)

(72) Inventors: Feng Gao, Shenzhen (CN); Feng Yu, Beijing (CN); Bo Lin, Beijing (CN); Guangwei Yu, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 76 days.

(21) Appl. No.: 16/845,795

(22) Filed: Apr. 10, 2020

(65) Prior Publication Data

US 2020/0245403 A1 Jul. 30, 2020

Related U.S. Application Data

(63) Continuation of application No. PCT/CN2018/109494, filed on Oct. 9, 2018.

(30) Foreign Application Priority Data

Oct. 13, 2017 (CN) .......................... 201710950499.6

(51) Int. Cl.
*H04W 80/08* (2009.01)
*H04L 5/00* (2006.01)
*H04W 28/06* (2009.01)

(52) U.S. Cl.
CPC ........... *H04W 80/08* (2013.01); *H04L 5/0082* (2013.01); *H04W 28/06* (2013.01)

(58) Field of Classification Search
CPC ... H04W 80/08; H04W 28/06; H04W 56/004; H04W 24/02; H04W 80/00;
(Continued)

(56) References Cited

U.S. PATENT DOCUMENTS 7,298,701 B2* 11/2007 Hsu ....................... H04L 1/1848
370/252
2011/0122893 A1* 5/2011 Kang ....................... H04L 69/22
370/477

(Continued)

FOREIGN PATENT DOCUMENTS

| CN | 101183897 A | 5/2008 |
| CN | 101931875 A | 12/2010 |
| CN | 106488517 A | 3/2017 |

OTHER PUBLICATIONS

3GPP TS 22.261 V16.1.0 (Sep. 2017);3rd Generation Partnership Project;Technical Specification Group Services and System Aspects-;Service requirements for the 5G system;Stage 1(Release 16);total 52 pages.

*Primary Examiner* — Afshawn M Towfighi
(74) *Attorney, Agent, or Firm* — Womble Bond Dickinson (US) LLP

(57) ABSTRACT

This application provides a communication method and a communications apparatus. The communication method includes: determining, by a transmit end device, a first moment, where the first moment is a moment when a receive end device needs to deliver first data to an upper layer of a communications protocol layer of the receive end device; and sending, by the transmit end device, first indication information and the first data, where the first information is used to instruct the receive end device to deliver the first data to the upper layer of the communications protocol layer of the receive end device at the first moment. The receive end device can be supported in determining the first moment based on the first indication information and delivering the first data to the upper layer of the communications protocol layer at the first moment.

14 Claims, 7 Drawing Sheets

(58) Field of Classification Search
CPC . H04L 5/0082; H04L 1/00; H04L 5/00; H04L 1/0023; H04L 5/0053; H04L 5/0078
See application file for complete search history.

(56) References Cited

U.S. PATENT DOCUMENTS

2014/0247839 A1* 9/2014 Kingsley ................. H04L 43/12
370/503
2016/0021577 A1* 1/2016 Du ........................ H04W 74/04
370/336

* cited by examiner

COMMUNICATION METHOD AND COMMUNICATIONS APPARATUS TO DELIVER FIRST DATA TO AN UPPER LAYER

CROSS-REFERENCE TO RELATED APPLICATIONS

This application is a continuation of International Application No. PCT/CN2018/109494, filed on Oct. 9, 2018, which claims priority to Chinese Patent Application No. 201710950499.6, filed on Oct. 13, 2017. The disclosures of the aforementioned applications are hereby incorporated by reference in their entireties.

TECHNICAL FIELD

This application relates to the communications field, and more specifically, to a communication method and a communications apparatus.

BACKGROUND

Currently, a control technology that a receive end device receives an operation instruction (in other words, control information) sent by a transmit end device, and after receiving the control information, immediately performs an action instructed by the operation instruction is known. In the technology, to ensure accurate control on the action performed by the receive end, the transmit end device needs to learn of a transmission latency of the control information between the transmit end device and the receive end device, to take the transmission latency into consideration when designing the operation instruction, so that the receive end device can perform the action instructed by the operation instruction at an expected time.

When the transmit end device and the receive end device communicate in a wired manner, the transmission latency is fixed, and therefore, the transmit end device can accurately speculate, based on the fixed transmission latency, the time of performing the action by the receive end device.

However, in the wired communication manner, cables need to be arranged between the transmit end device and the receive end device. Affected by an annular landform of a production site, and the like, cable layout may be relatively difficult, seriously affecting flexibility and costs of device layout.

In this regard, a wireless transmission manner may be considered to replace the wired transmission manner. However, in wireless transmission, due to the instability of a channel, it is difficult to fix the transmission latency between the transmit end device and the receive end device. That is, at different moments, the transmission latency between the transmit end device and the receive end device may change due to impact of quality of the channel or another factor. Consequently, the transmit end device cannot accurately predict the time of performing the action by the receive end device, increasing difficulty of designing the operation instruction.

How to alleviate the impact of indeterminacy of the transmission latency when the wireless transmission manner is applied to the foregoing control technology has become a problem that urgently needs to be resolved in the industry.

SUMMARY

This application provides a communication method, a communications apparatus, and a system, capable of alleviating the impact of indeterminacy of a transmission latency of a wireless transmission manner on action execution of a receive end device.

According to a first aspect, a communication method is provided, including: determining, by a transmit end device, a first moment, where the first moment is a moment when a receive end device needs to deliver first data to an upper layer of a communications protocol layer of the receive end device; and sending, by the transmit end device, first indication information and the first data, where the first indication information is used to instruct the receive end device to deliver the first data to the upper layer of the communications protocol layer of the receive end device at the first moment.

In the prior art, the receive end device immediately sends, after receiving data, the received data to the upper layer of the communications protocol layer. Therefore, the transmission latency has great impact on a receiving moment, severely affecting a moment when the receive end device performs an action corresponding to the data. On the contrary, in the communication method provided in the embodiments of this application, the transmit end device determines the first moment, where the first moment is the first moment when the receive end device needs to deliver the first data to the upper layer of the communications protocol layer; and sends, to the receive end device, the first indication information used to indicate the first moment and the first data. In this way, the receive end device can be supported in determining the first moment based on the first indication information and delivering the first data to the upper layer of the communications protocol layer at the first moment. Therefore, the receive end device can be supported in performing an action corresponding to the first data in the upper layer of the communications protocol layer at the first moment, thereby preventing the transmission latency from affecting execution by the receive end device of an action corresponding to the data.

It should be noted that, the communication method provided in the embodiments of this application may be applicable to a wired communication scenario, or may be applicable to a wireless communication scenario. This is not particularly limited in this application.

In one embodiment, an application program configured to perform the action corresponding to the first data based on the first data runs in the upper layer of the communications protocol layer.

In one embodiment, the first indication information includes indication information of the first moment.

The transmit end device directly uses the indication information of the first moment as the first indication information, so that processing burden of determining the first moment by the receive end device is reduced.

In one embodiment, the first indication information includes indication information of first duration, where the first moment is a moment that a preset second moment reaches after the first duration.

In this way, the receive end device can determine the first moment based on the information of the first duration, thereby reducing radio resource overheads used to carry the first indication information.

In one embodiment, the second moment includes a moment when the transmit end device receives the first data.

In one embodiment, the second moment includes a moment when the transmit end device sends the first data.

Usually, a header of a data packet sent by the transmit end device to the receive end device carries a moment when the transmit end device receives the data or sends the data. By using any one of the foregoing moments as the second moment used to determine the first moment, existing instantly stored information can be used to implement a process of indicating the first moment, thereby further improving the practicability and reliability of the communication method provided in this application.

In one embodiment, the transmit end device is an access network device, and the receive end device is a terminal device.

In one embodiment, the transmit end device is a terminal device, and the receive end device is an access network device.

In one embodiment, the sending, by the transmit end device, first indication information and the first data to the receive end device includes: performing, by the transmit end device, encapsulation on the first indication information and the first data in a first protocol layer, to generate a first data packet; and sending, by the transmit end device, the first data packet to the receive end device.

In one embodiment, the first protocol layer includes at least one protocol layer of a physical PHY layer, a media access control (MAC) layer, a radio link layer control protocol RLC layer, a packet data convergence protocol (PDCP) layer, and a service data adaptation protocol (SDAP) layer.

In one embodiment, the first protocol layer is at least one protocol layer of a plurality of protocol layers used for wireless communication between the transmit end device and the receive end device.

In one embodiment, the first protocol layer is at least one protocol layer of a plurality of protocol layers included in an air interface (in other words, radio interface) of the transmit end device.

In one embodiment, the transmit end device is a core network device, and the receive end device is a terminal device.

In one embodiment, the transmit end device is a terminal device, and the receive end device is a core network device.

In one embodiment, the sending, by the transmit end device, first indication information and the first data to the receive end device includes: performing, by the transmit end device, encapsulation on the first indication information and the first data in a non-access stratum NAS, to generate a second data packet; and sending, by the transmit end device, the second data packet to the receive end device by using an access network device.

In one embodiment, the sending, by the transmit end device, first indication information and the first data includes: determining, by the transmit end device, second duration, where the second duration is duration between a current moment and the first moment; and sending, by the transmit end device when determining that the second duration is greater than or equal to a preset first threshold, the first indication information and the first data.

In one embodiment, the first threshold is determined based on a data transmission latency between the transmit end device and the receive end device.

In one embodiment, the first threshold is determined based on the data transmission latency and processing duration. The processing duration is duration required by the receive end device from receiving the data in the transmission layer to delivering the received data to the upper layer of the communications protocol layer.

In one embodiment, before the sending, by the transmit end device, first indication information and the first data, the method further includes: receiving, by the transmit end device, second indication information from the receive end device, where the second indication information is used to indicate the processing duration.

Before sending the first data and the first indication information, the transmit end device determines a value relationship between the duration from the current moment to the first moment and the preset first threshold, where the first threshold may correspond to the data transmission latency; and when determining that the duration from the current moment to the first moment is greater than or equal to the preset first threshold, sends the first data and the first indication information to the receive end device, thereby reliably ensuring that the receive end device can send the first data at the first moment to the upper layer of the communications protocol layer.

According to a second aspect, a communication method is provided, including: receiving, by a receive end device, first indication information and first data, where the first indication information is used to instruct the receive end device to deliver the first data to an upper layer of a communications protocol layer of the receive end device at a first moment; and determining, by the receive end device based on the first indication information and a current moment, whether to deliver the first data to the upper layer of the communications protocol layer of the receive end device.

In the prior art, the receive end device immediately sends, after receiving data, the received data to the upper layer of the communications protocol layer. Therefore, the transmission latency has great impact on a receiving moment, severely affecting a moment when the receive end device performs an action corresponding to the data. On the contrary, in the communication method provided in the embodiments of this application, the transmit end device determines the first moment, where the first moment is the first moment when the receive end device needs to deliver the first data to the upper layer of the communications protocol layer; and sends, to the receive end device, the first indication information used to indicate the first moment and the first data. In this way, the receive end device can determine the first moment based on the first indication information and deliver the first data to the upper layer of the communications protocol layer at the first moment. Therefore, the receive end device can perform an action corresponding to the first data in the upper layer of the communications protocol layer at the first moment, thereby preventing the transmission latency from affecting execution by the receive end device of an action corresponding to the data.

In one embodiment, the determining, by the receive end device based on the first indication information, whether to deliver the first data to the upper layer of the communications protocol layer of the receive end device includes: if the current moment is before the first moment or the current moment is the first moment, delivering, by the receive end device at the first moment, the first data to the upper layer of the communications protocol layer of the receive end device.

In one embodiment, the determining, by the receive end device based on the first indication information, whether to deliver the first data to the upper layer of the communications protocol layer of the receive end device includes: if the current moment is after the first moment, discarding, by the receive end device, the first data.

In one embodiment, the first information includes indication information of the first moment.

The transmit end device directly uses the indication information of the first moment as the first indication information, so that processing burden of determining the first moment by the receive end device is reduced.

In one embodiment, the first information includes indication information of a first duration, where the first moment is a moment that a preset second moment reaches after the first duration; and the communication method further includes: determining, by the receive end device, the first moment based on the second moment and the first duration.

In this way, the receive end device can determine the first moment based on the information of the first duration, thereby reducing radio resource overheads used to carry the first indication information.

In one embodiment, the second moment includes a moment when the transmit end device receives the first data.

In one embodiment, the second moment includes a moment when the transmit end device sends the first data.

Usually, a header of a data packet sent by the transmit end device to the receive end device carries a moment when the transmit end device receives the data or sends the data. By using any one of the foregoing moments as the second moment used to determine the first moment, existing instantly stored information can be used to implement a process of indicating the first moment, thereby further improving the practicability and reliability of the communication method provided in this application.

In one embodiment, the transmit end device is an access network device, and the receive end device is a terminal device.

In one embodiment, the transmit end device is a terminal device, and the receive end device is an access network device.

In one embodiment, the receiving, by a receive end device, first indication information and first data includes: receiving, by the receive end device, a first data packet from the transmit end device; and performing, by the receive end device, decapsulation on the first data packet in a first protocol layer, to obtain the first indication information and the first data.

In one embodiment, the first protocol layer includes at least one protocol layer of a physical PHY layer, a media access control (MAC) layer, a radio link layer control protocol RLC layer, a packet data convergence protocol (PDCP) layer, and a service data adaptation protocol (SDAP) layer.

In one embodiment, the first protocol layer is at least one protocol layer of a plurality of protocol layers used for wireless communication between the transmit end device and the receive end device.

In one embodiment, the first protocol layer is at least one protocol layer of a plurality of protocol layers included in an air interface (in other words, radio interface) of the transmit end device.

In one embodiment, the transmit end device is a core network device, and the receive end device is a terminal device.

In one embodiment, the transmit end device is a terminal device, and the receive end device is a core network device.

In one embodiment, the receiving, by a receive end device, first indication information and first data includes: receiving, by the receive end device, a second data packet from the transmit end device by using an access network device; and performing, by the transmit end device, decapsulation on the second data packet in a non-access stratum NAS, to obtain the first indication information and the first data.

According to a third aspect, a communication method is provided, including: determining, by a transmit end device, a first period, where the first period is a period when a receive end device needs to deliver first data to an upper layer of a communications protocol layer of the receive end device; and sending, by the transmit end device, first indication information and the first data, where the first indication information is used to instruct the receive end device to deliver the first data to the upper layer of the communications protocol layer of the receive end device in the first period.

In the prior art, the receive end device immediately sends, after receiving data, the received data to the upper layer of the communications protocol layer. Therefore, the transmission latency has great impact on a receiving moment, severely affecting a moment when the receive end device performs an action corresponding to the data. On the contrary, in the communication method provided in the embodiments of this application, the transmit end device determines the first period, where the first period is the first period when the receive end device needs to deliver the first data to the upper layer of the communications protocol layer; and sends, to the receive end device, the first indication information used to indicate the first period and the first data. In this way, the receive end device can be supported in determining the first period based on the first indication information and delivering the first data to the upper layer of the communications protocol layer in the first period. Therefore, the receive end device can be supported in performing an action corresponding to the first data in the upper layer of the communications protocol layer in the first period, thereby preventing the transmission latency from affecting execution by the receive end device of an action corresponding to the data.

It should be noted that, the communication method provided in the embodiments of this application may be applicable to a wired communication scenario, or may be applicable to a wireless communication scenario. This is not particularly limited in this application.

In one embodiment, an application program configured to perform the action corresponding to the first data based on the first data runs in the upper layer of the communications protocol layer.

In one embodiment, the first indication information includes indication information of the first period.

The transmit end device directly uses the indication information of the first period as the first indication information, so that processing burden of determining the first period by the receive end device is reduced.

In one embodiment, the first indication information includes indication information of first duration, where a third moment specified in the first period is a moment that a preset second moment reaches after the first duration.

In this way, the receive end device can determine the first period based on the information of the first duration, thereby reducing radio resource overheads used to carry the first indication information.

In addition, a location of the third moment in the first period may be specified by the communications system or the communications protocol.

Alternatively, the location of the third moment in the first period may be indicated by a network device.

For example, the third moment may be a starting moment of the first period.

For another example, the third moment may be an ending moment of the first period.

In one embodiment, the second moment includes a moment when the transmit end device receives the first data.

In one embodiment, the second moment includes a moment when the transmit end device sends the first data.

In addition, duration of the first period may be specified by the communications system or the communications protocol.

Alternatively, the duration of the first period may be indicated by a network device.

Usually, a header of a data packet sent by the transmit end device to the receive end device carries a moment when the transmit end device receives the data or sends the data. By using any one of the foregoing moments as the second moment used to determine the first period, existing instantly stored information can be used to implement a process of indicating the first period, thereby further improving the practicability and reliability of the communication method provided in this application.

In one embodiment, the transmit end device is an access network device, and the receive end device is a terminal device.

In one embodiment, the transmit end device is a terminal device, and the receive end device is an access network device.

In one embodiment, the sending, by the transmit end device, first indication information and the first data to the receive end device includes: performing, by the transmit end device, encapsulation on the first indication information and the first data in a first protocol layer, to generate a first data packet; and sending, by the transmit end device, the first data packet to the receive end device.

In one embodiment, the first protocol layer includes at least one protocol layer of a physical PHY layer, a media access control (MAC) layer, a radio link layer control protocol RLC layer, a packet data convergence protocol (PDCP) layer, and a service data adaptation protocol (SDAP) layer.

In one embodiment, the first protocol layer is at least one protocol layer of a plurality of protocol layers used for wireless communication between the transmit end device and the receive end device.

In one embodiment, the first protocol layer is at least one protocol layer of a plurality of protocol layers included in an air interface (in other words, radio interface) of the transmit end device.

In one embodiment, the transmit end device is a core network device, and the receive end device is a terminal device.

In one embodiment, the transmit end device is a terminal device, and the receive end device is a core network device.

In one embodiment, the sending, by the transmit end device, first indication information and the first data to the receive end device includes: performing, by the transmit end device, encapsulation on the first indication information and the first data in a non-access stratum NAS, to generate a second data packet; and sending, by the transmit end device, the second data packet to the receive end device by using an access network device.

In one embodiment, the sending, by the transmit end device, first indication information and the first data includes: determining, by the transmit end device, second duration, where the second duration is duration between a current moment and a fourth moment specified in the first period; and sending, by the transmit end device when determining that the second duration is greater than or equal to a preset first threshold, the first indication information and the first data.

For example, the fourth moment may be a starting moment of the first period.

Alternatively, the fourth moment may be an ending moment of the first period.

Alternatively, the fourth moment may be an intermediate moment of the first period.

In one embodiment, the first threshold is determined based on a data transmission latency between the transmit end device and the receive end device.

In one embodiment, the first threshold is determined based on the data transmission latency and processing duration. The processing duration is duration required by the receive end device from receiving the data in the transmission layer to delivering the received data to the upper layer of the communications protocol layer.

In one embodiment, before the sending, by the transmit end device, first indication information and the first data, the method further includes: receiving, by the transmit end device, second indication information from the receive end device, where the second indication information is used to indicate the processing duration.

Before sending the first data and the first indication information, the transmit end device determines a value relationship between the duration from the current moment to the fourth moment specified in the first period and the preset first threshold, where the first threshold may correspond to the data transmission latency; and when determining that the duration from the current moment to the fourth moment is greater than or equal to the preset first threshold, sends the first data and the first indication information to the receive end device, thereby reliably ensuring that the receive end device can send the first data in the first period to the upper layer of the communications protocol layer.

According to a fourth aspect, a communication method is provided, including: receiving, by a receive end device, first indication information and first data, wherein the first information is used to instruct the receive end device to deliver the first data to an upper layer of a communications protocol layer of the receive end device in a first period; and determining, by the receive end device based on the first indication information and a current moment, whether to deliver the first data to the upper layer of the communications protocol layer of the receive end device.

In the prior art, the receive end device immediately sends, after receiving data, the received data to the upper layer of the communications protocol layer. Therefore, the transmission latency has great impact on a receiving moment, severely affecting a moment when the receive end device performs an action corresponding to the data. On the contrary, in the communication method provided in the embodiments of this application, the transmit end device determines the first period, where the first period is the first period when the receive end device needs to deliver the first data to the upper layer of the communications protocol layer; and sends, to the receive end device, the first indication information used to indicate the first period and the first data. In this way, the receive end device can determine the first period based on the first indication information and deliver the first data to the upper layer of the communications protocol layer in the first period. Therefore, the receive end device can perform an action corresponding to the first data in the upper layer of the communications protocol layer in the first period, thereby preventing the transmission latency from affecting execution by the receive end device of an action corresponding to the data.

In one embodiment, the determining, by the receive end device based on the first indication information, whether to deliver the first data to the upper layer of the communications protocol layer of the receive end device includes: if the current moment is before the first period or the current moment is in the first period, delivering, by the receive end device in the first period, the first data to the upper layer of the communications protocol layer of the receive end device.

In one embodiment, the determining, by the receive end device based on the first indication information, whether to deliver the first data to the upper layer of the communications protocol layer of the receive end device includes: if the current moment is after the first period, discarding, by the receive end device, the first data.

In one embodiment, the first information includes indication information of the first period.

The transmit end device directly uses the indication information of the first period as the first indication information, so that processing burden of determining the first period by the receive end device is reduced.

In one embodiment, the first information includes indication information of first duration, where a third moment preset in the first period is a moment that a preset second moment reaches after the first duration; and the communication method further includes: determining, by the receive end device, the first period based on the second moment and the first duration.

In this way, the receive end device can determine the first period based on the information of the first duration, thereby reducing radio resource overheads used to carry the first indication information.

In addition, a location of the third moment in the first period may be specified by the communications system or the communications protocol.

Alternatively, the location of the third moment in the first period may be indicated by a network device.

For example, the third moment may be a starting moment of the first period.

For another example, the third moment may be an ending moment of the first period.

In addition, duration of the first period may be specified by the communications system or the communications protocol.

Alternatively, the duration of the first period may be indicated by a network device.

In one embodiment, the second moment includes a moment when the transmit end device receives the first data.

In one embodiment, the second moment includes a moment when the transmit end device sends the first data.

Usually, a header of a data packet sent by the transmit end device to the receive end device carries a moment when the transmit end device receives the data or sends the data. By using any one of the foregoing moments as the second moment used to determine the first period, existing instantly stored information can be used to implement a process of indicating the first period, thereby further improving the practicability and reliability of the communication method provided in this application.

In one embodiment, the transmit end device is an access network device, and the receive end device is a terminal device.

In one embodiment, the transmit end device is a terminal device, and the receive end device is an access network device.

In one embodiment, the receiving, by a receive end device, first indication information and first data includes: receiving, by the receive end device, a first data packet from the transmit end device; and performing, by the receive end device, decapsulation on the first data packet in the first protocol layer, to obtain the first indication information and the first data.

In one embodiment, the first protocol layer includes at least one protocol layer of a physical PHY layer, a media access control (MAC) layer, a radio link layer control protocol RLC layer, a packet data convergence protocol (PDCP) layer, and a service data adaptation protocol (SDAP) layer.

In one embodiment, the first protocol layer is at least one protocol layer of a plurality of protocol layers used for wireless communication between the transmit end device and the receive end device.

In one embodiment, the first protocol layer is at least one protocol layer of a plurality of protocol layers included in an air interface (in other words, radio interface) of the transmit end device.

In one embodiment, the transmit end device is a core network device, and the receive end device is a terminal device.

In one embodiment, the transmit end device is a terminal device, and the receive end device is a core network device.

In one embodiment, the receiving, by a receive end device, first indication information and first data includes: receiving, by the receive end device, a second data packet from the transmit end device by using an access network device; and performing, by the transmit end device, decapsulation on the second data packet in a non-access stratum NAS, to obtain the first indication information and the first data.

According to a fifth aspect, a communications apparatus is provided, including units configured to perform the operations in any aspect of the first aspect to the fourth aspect and the embodiments thereof.

In one embodiment, the apparatus includes a chip or a circuit, for example, a chip or circuit disposed in a communications device.

In one embodiment, the apparatus is a communications device, such as a terminal device, an access network device, or a core network device.

According to a sixth aspect, a communications device is provided, including a memory and a processor. The memory is configured to store a computer program, and the processor is configured to: invoke the computer program from the memory and run the computer program, to enable the communications device to perform the communication method according to any aspect of the first aspect to the fourth aspect and the embodiments thereof.

According to a seventh aspect, a chip system is provided, including a memory and a processor. The memory is configured to store a computer program, and the processor is configured to: invoke the computer program from the memory and run the computer program, to enable a communications device installed with the chip system to perform the communication method according to any aspect of the first aspect to the fourth aspect and the embodiments thereof.

According to an eighth aspect, a computer program product is provided. The computer program product includes computer program code. When the computer program code is run by a communications unit, processing unit, transceiver, or processor of a communications device (such as a terminal device, an access network device, or a core network device), the communications device is enabled to perform the communication method according to any aspect of the first aspect to the fourth aspect and the embodiments thereof.

According to a ninth aspect, a computer-readable storage medium is provided. The computer-readable storage medium stores a program, and the program enables a communications device (such as a terminal device, an access network device, or a core network device) to perform the communication method according to any aspect of the first aspect to the fourth aspect and the embodiments thereof.

The communication method and communications apparatus provided in the embodiments of this application can alleviate the impact of indeterminacy of a transmission latency of a wireless transmission manner on action execution of a receive end device.

DESCRIPTION OF EMBODIMENTS

Figure 1:
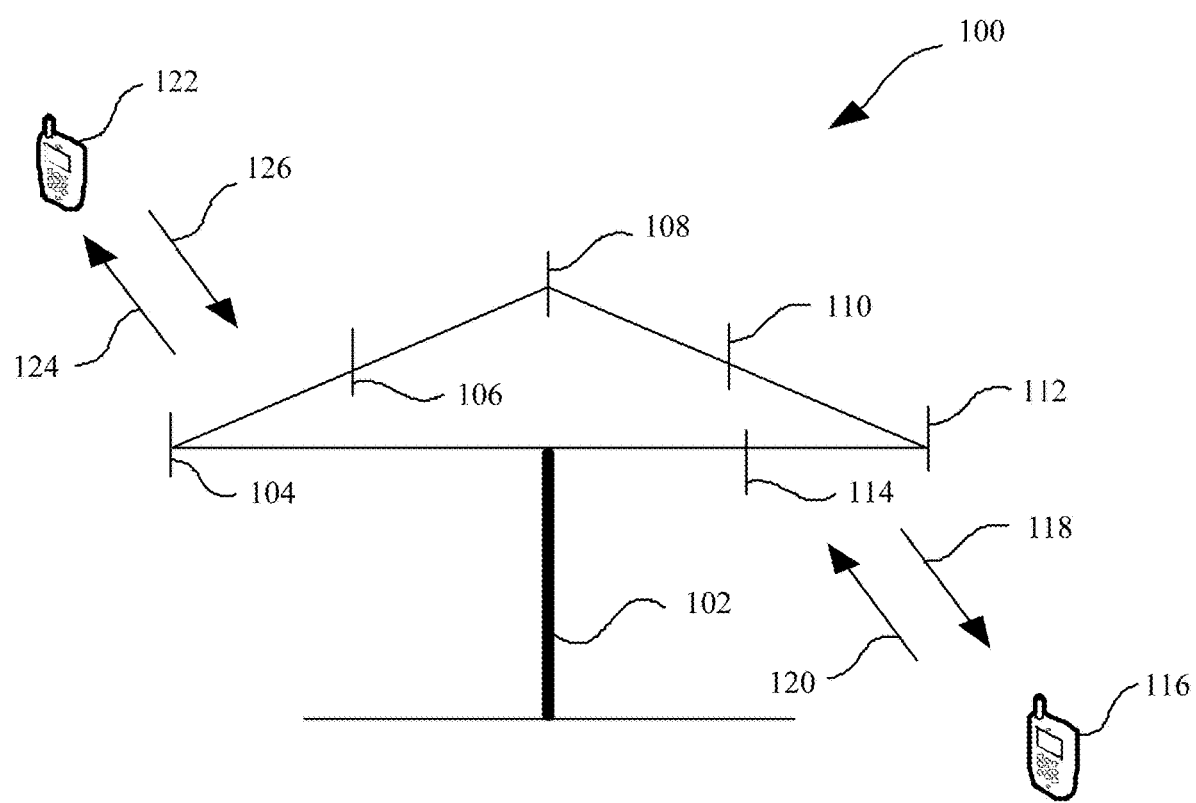
FIG. 1 is a schematic diagram of an example of a communications system according to an embodiment of this application.

The following describes technical solutions of this application with reference to accompanying drawings.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both an application that runs on a computing device and a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be understood that the embodiments of this application may be applied to various communications systems such as a global system for mobile communications (GSM), a code division multiple access (CDMA) system, a wideband code division multiple access (WCDMA) system, a general packet radio service (GPRS) system, a long term evolution (LTE) system, an advanced long term evolution advanced (LTE-A) system, a universal mobile telecommunications system (UMTS), a wireless local area network (WLAN) system, a wireless fidelity (WiFi) system, or a next-generation communications system. Herein, the next-generation communications system may include, for example, a fifth-generation (5G) communications system.

Generally, a conventional communications system supports a limited quantity of connections and is easy to implement. However, with development of communications technologies, a mobile communications system not only supports conventional communication, but also supports, for example, device-to-device (D2D) communication, machine-to-machine (M2M) communication, machine type communication (MTC), and vehicle-to-vehicle (V2V) communication.

In the embodiments of this application, the receive end device can receive data from the transmit end device, and perform an action (in other words, processing) corresponding to the data in an application layer. By way of example but not limitation, for example, the receive end device may be a device controlled by a control device (such as a programmable logic controller (PLC)), such as an industrial robot. Specifically, the receive end device can receive (for example, directly receive or receive through a relay) an operation instruction (namely, an example of the data) from a controller (for example, the foregoing PLC), and perform an action instructed by the operation instruction. It should be understood that, the listed specific examples of the transmit end device or the receive end device are only examples for description, and this application is not limited thereto.

By way of example but not limitation, in the embodiments of this application, the receive end device may include a communications protocol layer (in other words, a transmission layer or a communications module) and an upper layer (in other words, a function execution module) of the communications protocol layer. The communications protocol layer is used to receive or send data in a wireless communication manner or a wired communication manner; and the upper layer (for example, an application layer) of the communications protocol layer is used to perform processing corresponding to received data (for example, to perform an action instructed by a received operation instruction). By way of example but not limitation, the receive end device may be an industrial robot or another intelligent device. By way of example but not limitation, the communications protocol layer may be provided with any existing communications protocol, in other words, air interface protocol, to implement wireless communication. For example, the communications protocol layer may include a communications protocol stack. Moreover, the upper layer (for example, an application layer) of the communications protocol layer can run an application program, and the application program controls the action of the receive end device. For ease of understanding and description, an example in which the upper layer of the communications protocol layer is an application layer is used for description below.

Similarly, the transmit end device is also provided with a communications protocol layer (in other words, a transmission layer, such as the foregoing communications protocol stack), and implements wireless communication by using the communications protocol layer.

Herein, the communications protocol stack may also be referred to as a protocol stack, which refers to a sum of protocols at layers in a network, and vividly reflects a file transmission process in a network: from an upper-layer protocol to an underlying protocol, and then from the underlying protocol to the upper-layer protocol.

By way of example but not limitation, in the embodiments of this application, the communications protocol layer used for wireless communication may include at least one of the following protocol layers or a combination of a plurality of protocol layers of the following protocol layers, where a protocol at each layer may include a plurality of protocol entities:

I 1. Packet Data Convergence Protocol (PDCP) Layer

The PDCP layer is located above an RLC layer, and is responsible for processing service data of a packet service. The PDCP is mainly used to process packet data, such as an Internet protocol (IP) data flow, of a bearer network layer on an air interface. The PDCP layer is mainly used to compress and decompress/encrypt and decrypt information.

I 2. Radio Link Control (RLC) Layer

The RLC is a protocol that is formulated for ensuring reliable quality of service (QoS) of a data transmission service in a third-generation mobile system. A data transmission channel status of mobile communication is poor in a radio propagation environment, and a bit error rate in data transmission is extremely high. Therefore, to ensure the quality of service of the data transmission service is a difficult task.

The RLC layer is located above a MAC layer, and is mainly used to provide abstraction of different data link types for the upper layer, where providing a reliable data transmission link is predominant. The link type is used to eliminate impact brought by the radio link and provide reliable data transmission for the upper layer. The RLC layer implements such logical link abstraction by using different data packet receiving and sending processing mechanisms (such as segmentation and automatic repeat-request (ARQ)). The RLC layer can segment and cascade information, or reassemble segmented and cascaded information.

I 3. Media Access Control (MAC) Layer

The MAC layer is located above a physical layer, and is mainly responsible for controlling and connecting a physical medium of the physical layer and used for selecting a transmission format combination, to implement a function related to scheduling and related to a hybrid automatic repeat request (HARM).

The foregoing PDCP layer, RLC layer, and MAC layer may also be referred to as L2 layers.

I 4. Physical Layer

The PHY layer may also be referred to as an L1 layer, and is mainly used for providing an information transmission service for the MAC layer and a higher layer, and performing encoding and modulation or demodulation and decoding based on the selected transmission format combination.

I 5. Radio Resource Control (RRC) Layer

The RRC layer may also be referred to as an L3 layer, and may include, but is not limited to, the following functions:

(1) System information broadcasting.
(2) RRC connection control, including:
a. Paging.
b. RRC connection setup, modification, and release.
c. Initial security activation.
d. RRC connection mobility, including intra-frequency and inter-frequency handover, related security processing, a key/algorithm change, and a specification of RRC context information transmitted between network nodes.
e. Setup, modification, and release of a user data resource block bearer.

f. Radio resource configuration management, including assignment and modification of an ARQ configuration, an HARQ configuration, a discontinuous reception (DRX) configuration, and the like.

g. QoS control, including configuration and modification of uplink and downlink semi-persistent scheduling configuration information, and an uplink rate control parameter of a UE side.

h. Radio link failure recovery.

(3) Transferability between radio access technologies (RAT).

(4) Measurement configuration and reporting, where specifically, the following procedures may be included:

a. Setup, modification, and release of measurement (such as intra-frequency and inter-frequency measurement, and measurement of different RATs).

b. Setup and release of a measurement interval.
c. Measurement reporting.

(5) Another function, such as non-3GPP dedicated information transmission, or transmission of UE radio access performance information.

(6) Error processing in a versatile protocol.
(7) Self configuration and self optimization.

I 6. Service Data Adaptation Protocol (SDAP) Layer

The SDAP layer may be located above the PDCP layer and is responsible for various types of mapping between a QoS data flow and a data radio bearer, and for marking data flow identifiers in uplink and downlink data packets.

It should be understood that, the listed protocol layers and functions of the protocol layers included in the communications protocol layer (in other words, communications protocol stack) are merely examples for description, and this application is not limited thereto. Other protocol layers that can be used for wireless communication or wired communication and functions thereof all fall into the protection scope of the embodiments of this application.

For example, the transmit end device may be a network side device, such as an access network device or a core network device. The receive end device may be a terminal device.

For another example, the transmit end device may be a terminal device. The receive end device may be a network side device, such as an access network device or a core network device.

By way of example but not limitation, in the embodiments of this application, the terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a WLAN, a cellular phone, a cordless phone, a session initiation protocol (SIP) phone, a wireless local loop (WLL) station, a personal digital assistant (Personal Digital Assistant, PDA) device, a handheld device having a wireless communication function, a computing device, another processing device connected to a wireless modem, an in-vehicle device, a wearable device, a terminal device in a next-generation communications system, such as a 5G network, a terminal device in a future evolved public land mobile network (PLMN), or the like.

By way of example but not limitation, in the embodiments of this application, the terminal device may also be a wearable device. A wearable device may also be referred to as a wearable intelligent device, and is a general term of wearable devices, such as glasses, gloves, watches, clothes, and shoes, that are developed by applying wearable technologies to intelligent designs of daily wear. A wearable device is a portable device that can be directly worn on a body or integrated into clothes or an accessory of a user. A wearable device is not merely a hardware device, but is used to implement a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, in the embodiments of this application, the terminal device may also be a terminal device in an Internet of Things (IoT) system. The IoT is an important component in the future development of information technologies, and a main technical feature thereof is connecting objects to the network by using communications technologies, to implement a smart network in which humans and machines are connected, and things are connected.

In the embodiments of this application, the IoT technology can achieve massive connections, in-depth coverage, and energy saving for a terminal, by using a narrow band NB technology. For example, the NB includes only one resource block (RB), that is, a bandwidth of the NB is only 180 KB. To achieve massive connections, terminals need to access in a discrete manner. In the communication method according to the embodiments of this application, a congestion problem that occurs when massive terminals access the network through the NB in the IoT technology can be effectively resolved.

The access network device may be an access network device or another device configured to communicate with a mobile device. The access network device may be an access point (AP) in a WLAN or a base transceiver station (BTS) in GSM or CDMA; or may be a NodeB (NB) in WCDMA; or may be a gNB in a new radio (NR) system; or may be an evolved NodeB (eNB or eNodeB) in LTE, or a relay station or an access point, or an in-vehicle device, a wearable device, an access network device in a future 5G network, an access network device in a future evolved PLMN network, or the like.

Moreover, in the embodiments of this application, the access network device provides a service for a cell, and the terminal device communicates with the access network device by using a transmission resource (for example, a frequency domain resource or a spectrum resource) used by the cell. The cell may be a cell corresponding to the access network device (for example, a base station). The cell may belong to a macro base station, or may belong to a base station corresponding to a small cell. The small cell herein may include: a metro cell, a micro cell, a pico cell, a femto cell, and the like. These small cells have features of small coverage and low transmit power, and are suitable for providing high-rate data transmission services.

In addition, a plurality of cells may operate on a same frequency on a carrier in an LTE system or a 5G system. In some special scenarios, it may also be considered that a concept of the carrier is equivalent to that of the cell. For example, in a carrier aggregation (CA) scenario, when a secondary carrier is configured for UE, a carrier index of the secondary carrier and a cell identity (Cell ID) of a secondary serving cell operating on the secondary carrier are both carried. In this case, it may be considered that a concept of a carrier is equivalent to that of a cell, for example, access by UE to a carrier is equivalent to access to a cell.

The core network device may be connected to a plurality of access network devices and is configured to control the access network devices, and may deliver data received from a network side (for example, the Internet) to the access network devices.

The foregoing listed functions and specific embodiments of the terminal device, the access network device, and the core network device are merely examples for description. This application is not limited thereto.

In the embodiments of this application, the terminal device or the network device includes a hardware layer, an operating system layer run on the hardware layer, and an application layer run on the operating system layer. The hardware layer includes hardware such as a central processing unit (CPU), a memory management unit (MMU), and a memory (also referred to as a main memory). The operating system may be any one or more computer operating systems such as a Linux operating system, a Unix operating system, an Android operating system, an iOS operating system, or a Windows operating system that implement service processing by using a process. The application layer includes an application such as a browser, an address book, word processing software, or instant messaging software. In addition, in the embodiments of this application, a specific structure of an execution body of the method provided in the embodiments of this application is not particularly limited, provided that communication can be performed based on the method provided in the embodiments of this application by running a program of code recording the method provided in the embodiments of this application. For example, the execution body of the method provided in the embodiments of this application may be a terminal device or a network device, or a functional module that is in a terminal device or a network device and that can invoke a program and execute the program.

In addition, aspects or features in the embodiments of this application may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a compact disc (CD), a digital versatile disc (DVD), a smart card and a flash memory component (for example, erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

It should be noted that, in the embodiments of this application, a plurality of application programs can be run on the application layer. In this case, an application program performing the communication method in the embodiments of this application and an application program configured to control the receive end device to complete the action corresponding to the received data may be different application programs.

FIG. 1 is a schematic diagram of a system 100 to which the communication method in the embodiments of this application is applicable. As shown in FIG. 1, the system 100 includes an access network device 102. The access network device 102 may include one or more antennas, for example, antennas 104, 106, 108, 110, 112, and 114. In addition, the access network device 102 may additionally include a transmitter chain and a receiver chain, and a person of ordinary skill in the art may understand that both the transmitter chain and the receiver chain may include a plurality of components (for example, a processor, a modulator, a multiplexer, a demodulator, a demultiplexer, or an antenna) related to signal sending and receiving.

The access network device 102 may communicate with a plurality of terminal devices (for example, a terminal device 116 and a terminal device 122). However, it may be understood that the access network device 102 may communicate with any quantity of terminal devices similar to the terminal device 116 or terminal device 122. The terminal devices 116 and 122 each may be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114, where the antennas 112 and 114 send information to the terminal device 116 by using a forward link (also referred to as a downlink) 118, and receive information from the terminal device 116 by using a reverse link (also referred to as an uplink) 120. In addition, the terminal device 122 communicates with the antennas 104 and 106, where the antennas 104 and 106 send information to the terminal device 122 by using a forward link 124, and receive information from the terminal device 122 by using a reverse link 126.

For example, in a frequency division duplex (Frequency Division Duplex, FDD) system, for example, the forward link 118 and the reverse link 120 may use different frequency bands, and the forward link 124 and the reverse link 126 may use different frequency bands.

For another example, in a time division duplex (TDD) system and a full duplex system, the forward link 118 and the reverse link 120 may use a same frequency band, and the forward link 124 and the reverse link 126 may use a same frequency band.

Each antenna (or an antenna group including a plurality of antennas) and/or an area designed for communication are/is referred to as a sector of the access network device 102. For example, an antenna group may be designed to communicate with a terminal device in a sector within a coverage area of the access network device 102. The access network device may send a signal to each terminal device in a sector corresponding to the access network device by using a single antenna or a multi-antenna transmit diversity. In a process in which the access network device 102 communicates with the terminal devices 116 and 122 respectively by using the forward links 118 and 124, a transmit antenna of the access network device 102 may also improve signal-to-noise ratios of the forward links 118 and 124 through beamforming. In addition, as compared with a manner in which an access network device sends signals to all terminal devices of the access network device by using a single antenna or a multi-antenna transmit diversity, when the access network device 102 sends, through beamforming, signals to the terminal devices 116 and 122 that are randomly dispersed in a related coverage area, a mobile device in a neighboring cell suffers less interference.

In a given time, the access network device 102, the terminal device 116, or the terminal device 122 may be a wireless communications sending apparatus and/or a wireless communications receiving apparatus. During data transmission, the wireless communications sending apparatus may encode data for transmission. Specifically, the wireless communications sending apparatus may obtain (for example, generate, receive from another communications apparatus, or store in a memory) a given quantity of data bits that need to be sent to the wireless communications receiving apparatus through a channel. Such data bits may be included in a transport block (or a plurality of transport blocks) of data, and the transport block may be segmented to generate a plurality of code blocks.

In addition, the communications system 100 may be a PLMN network, a D2D network, an M2M network, an IoT network, or another network. FIG. 1 is merely a simplified schematic diagram as an example, and the network may further include another access network device not shown in FIG. 1.

Moreover, although not shown in the figure, a core network device communicatively connected to the access network device 102 is further included in the communications system 100.

The communication method in the embodiments of this application is described below in detail with reference to FIG. 2 and FIG. 4.

Figure 2:
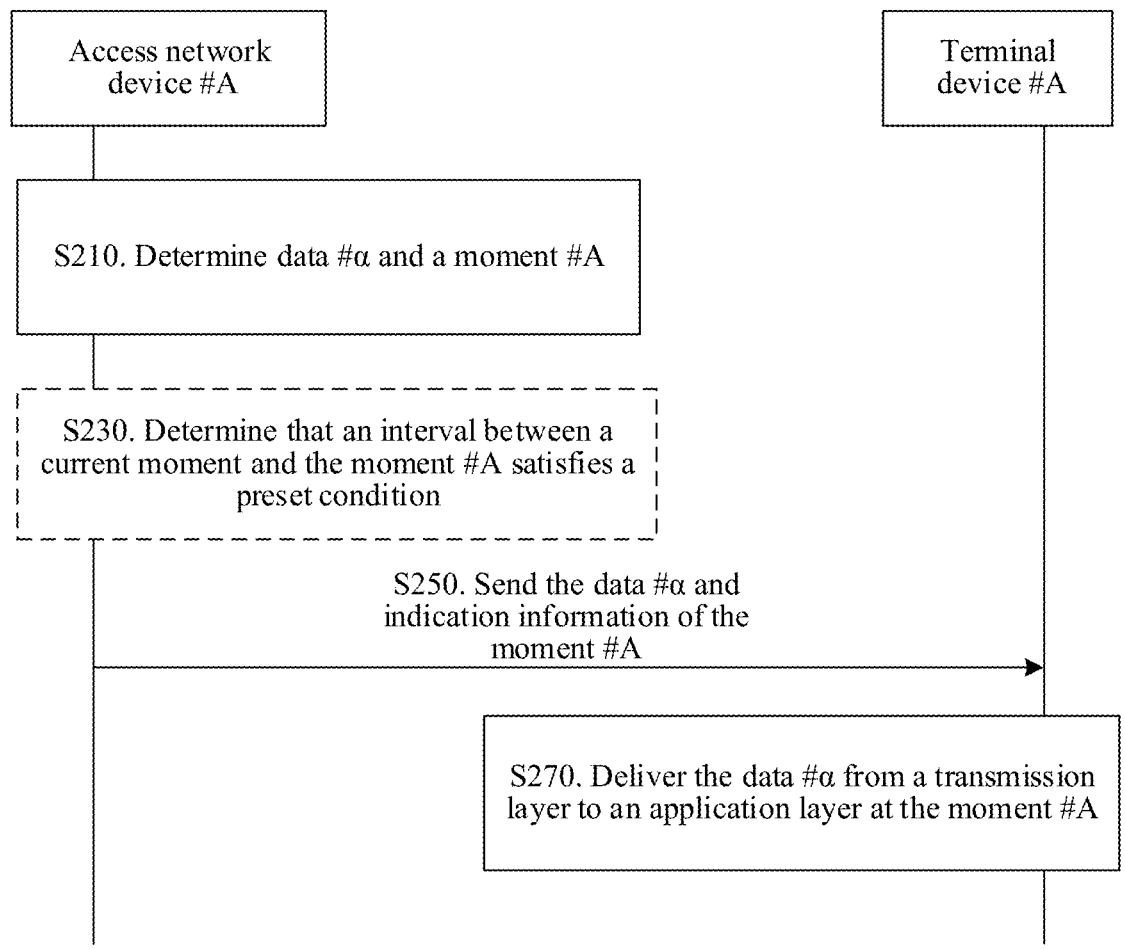
FIG. 2 is a schematic flowchart of an example of a communication method according to an embodiment of this application.

As shown in FIG. 2, a process of transmitting data #α (namely, an example of the first data) between an access network device #A (namely, an example of the transmit end device) and a terminal device #A (namely, an example of the receive end device) is described.

The application program #α may be installed in an application layer of the terminal device #A, and the application program #α can perform, after the data #α is entered, an action corresponding to the data #α. For example, the terminal device #A may be an industrial robot, and the data #α may be an operation instruction controlling an action of the robot, so that the application program #α can control, after the data #α is entered, the robot to perform an action instructed by the operation instruction. It should be understood that, the listed specific examples of the terminal device #A are merely examples for description, and this application is not limited thereto. The terminal device #A may alternatively be a mobile phone, a smart appliance, or any terminal device that has a communication function, can be installed with an application program, and can implement the function by using the application program.

In S210, the access network device #A may obtain the data #α.

For example, a server of the application program #α may be communicatively connected (for example, in a wired communication connection or a wireless communication connection) to the access network device #A. In this way, the server can send the data #α to the access network device #A. Moreover, the data #α may be entered to the server by a designer of the operation instruction, or the server may generate the data #α based on a preset algorithm. This is not particularly limited in this application.

For another example, the core network device may obtain the data #α and forward the data #α to the access network device. Moreover, By way of example but not limitation, a server of the application program #α may be communicatively connected (for example, in a wired communication connection or a wireless communication connection) to the core network device. In this way, the server can send the data #α to the core network device. Alternatively, the core network device may generate the data #α based on a preset algorithm.

It should be understood that, the listed methods and processes of obtaining the data #α by the access network device #A are merely examples for description, and this application is not limited thereto. For example, an administrator or a designer of the operation instruction may enter the data #α into the access network device #A, or the access network device #A may alternatively generate the data #α based on a preset algorithm.

In addition, in S210, the access network device #A may determine a moment #A, where the moment #A is a moment when the terminal device #A needs to transmit the data #α from the transmission layer of the terminal device #A (for example, a communications protocol stack in the terminal device #A) to the application layer (specifically, the foregoing application program #α) of the terminal device #A. Alternatively, the moment #A may be a moment when the terminal device #A performs the processing corresponding to the data #α.

By way of example but not limitation, in the embodiments of this application, the access network device #A may determine the moment #A in at least one of the following manners.

Manner 1

The server of the application program #α may be communicatively connected (for example, in a wired communication connection or a wireless communication connection) to the access network device #A.

In this way, the server may send indication information of the moment #A to the access network device #A. That is, the access network device #A may determine the moment #A based on the indication from the server.

By way of example but not limitation, the moment #A may be entered to the server by a designer of the operation instruction, or the server may obtain the moment #A through calculation based on a preset algorithm. Description of a same or similar situation is omitted below.

Manner 2

A core network device in the communications system 100 may be communicatively connected (for example, in a wired communication connection or a wireless communication connection) to the access network device #A.

In this way, the core network device determines the moment #A, and forwards the indication information of the moment #A to the access network device #A. That is, the access network device #A can determine the moment #A based on the indication from a core network.

By way of example but not limitation, the server of the application program #α may be communicatively connected (for example, in a wired communication connection or a wireless communication connection) to the core network device. In this way, the server can send the indication information of the moment #A to the core network device, or the core network device can alternatively determine the moment #A based on an input of the administrator.

It should be understood that, the listed manners of determining the moment #A by the access network device #A are merely examples for description, and this application is not limited thereto. For example, the administrator or the designer of the operation instruction may enter information of the moment #A to the access network device #A, so that the access network device #A can determine the moment #A based on the entered information.

It should be noted that, processes of determining the data #α and the moment #A by the access network device may be performed simultaneously, or may be performed in different operations. This is not particularly limited in this application.

It should be noted that, in this application, in S210, the access network device #A may determine a period #A. By way of example but not limitation, the access network device #A may determine the period #A based on the moment #A.

For example, duration of the period #A may be specified by a communications system or a communications protocol.

Alternatively, the duration of the period #A may be determined and indicated to the terminal device by a network device.

In addition, a location of the moment #A in the period #A may be specified by the communications system or the communications protocol.

Alternatively, the location of the moment #A in the period #A may be determined and indicated to the terminal device by the network device.

For example, the moment #A may be a starting moment of the period #A.

Alternatively, the moment #A may be an ending moment of the period #A.

Alternatively, the moment #A may be an intermediate moment of the period #A.

In S250, the access network device #A may generate information #A (namely, an example of first indication information) based on the moment #A, where the information #A can be used to determine the moment #A.

By way of example but not limitation, the information #A may include any one of the following indication manners:

Indication Manner 1

In one embodiment, the information #A may be used to directly indicate the moment #A. Specifically, the information #A indicates an absolute moment, and the absolute moment is the moment #A. In this way, the terminal device #A may directly determine the moment #A based on the information #A.

Indication Manner 2

In one embodiment, the information #A may be used to indirectly indicate the moment #A. Specifically, the information #A may be used to indicate duration #A, where the duration #A may be duration of an interval between the moment #A and a specified reference moment. In this way, the moment #A can be determined (in other words, calculated) based on the reference moment and the duration #A.

By way of example but not limitation, in the embodiments of this application, any one of the following moments may be used as the reference moment.

1. A moment (denoted as: moment #1 below for ease of understanding and description) when the access network device #A receives the data #α. Specifically, in the embodiments of this application, a data packet sent by the access network device to the terminal device may carry a moment when the access network device receives (for example, from a core network device or a server) data carried in the data packet. In this way, based on the foregoing mechanism, the terminal device #A can determine the moment #1 from the data packet that carries the data #α, and use the moment #1 as the reference moment. In this way, in the communication method according to the embodiments of this application, the moment #1 is used as the reference moment, so that the receive end device can easily learn of the moment when the transmit end device obtains the data, and the receive end device can easily learn of the moment when the data needs to be delivered from the transmission layer to the application layer.

2. A moment (denoted as: moment #2 below for ease of understanding and description) when the access network device #A sends the data #α. Specifically, in the embodiments of this application, a data packet sent by the access network device to the terminal device may carry a moment when the access network device sends the data packet. In this way, based on the foregoing mechanism, the terminal device #A can determine the moment #2 from the data packet that carries the data #α, and use the moment #2 as the reference moment. In this way, in the communication method according to the embodiments of this application, the moment #2 is used as the reference moment, so that the receive end device can easily learn of the moment when the transmit end device sends the data, and the receive end device can easily learn of the moment when the data needs to be delivered from the transmission layer to the application layer.

It should be understood that, the listed specific moments used as the reference moment are merely examples for description, and this application is not limited thereto. Any moment before the moment #A may be used as the reference moment, provided that the reference moments determined by the access network device #A and the terminal device #A are consistent. For example, the reference moment may alternatively be a moment when a user accesses the access network device #A and the terminal device #A. For another example, the reference moment may alternatively be a moment when the terminal device #A accesses the access network device #A.

Then, the access network device #A may send the data #α and the information #A to the terminal device #A.

By way of example but not limitation, in the embodiments of this application, the access network device #A may send the data #α and the information #A in the following manner.

In one embodiment, the access network device #A may perform, at a protocol layer #A (namely, an example of the first protocol layer) in the transmission layer, encapsulation on the data #α and the information #A, to generate a data packet #A (namely, an example of the first data packet), and send the data packet #A to the terminal device #A.

In this way, the terminal device #A may perform, at the protocol layer #A, decapsulation on the data packet #A to obtain the data #α and the information #A.

Herein, the protocol layer #A may include some protocol layers (for example, one or more protocol layers) or all protocol layers in a protocol stack that is configured in the access network device #A and the terminal device #A and that is used to implement wireless communication between the access network device #A and the terminal device #A.

By way of example but not limitation, the protocol layer #A may include one or more protocol layers of the foregoing PHY layer, MAC layer, RLC layer, PDCP layer, or RRC layer.

It should be understood that, the listed specific protocol layers that the protocol layer #A includes are merely examples for description, and this application is not limited thereto. Other protocol layers included in the protocol stack that can be used for wireless communication between the access network device and the terminal device all fall into the protection scope of the embodiments of this application.

In addition, the specific process and method of the foregoing encapsulation may be similar to the prior art. Herein, to avoid repeated descriptions, detailed descriptions thereof are omitted.

The data #α and the information #A are encapsulated in the same data packet, so that the data #α and the information #A can be both transmitted in a single transmission process, thereby improving communication efficiency and reducing communication resources and signaling.

In addition, in the embodiments of this application, the information #A may have a specified format, so that after receiving the information #A, the terminal device #A can identify, based on the format of the information #A, a moment when the information #A is used to instruct (directly instruct or indirectly instruct) the data to be delivered to the application layer. The "specified format" may be specified by the communications protocol, or the "specified format" may be determined through negotiation between the access network device and the terminal device. This is not particularly limited in this application.

Alternatively, the information #A may be carried in a specified message or field, so that the terminal device #A can identify, based on the message carrying the information #A or the field carrying the information #A, a moment when the information #A is used to instruct (directly instruct or indirectly instruct) the data to be delivered to the application layer. The "specified message or field" may be specified by the communications protocol, or the "specified message or field" may be determined through negotiation between the access network device and the terminal device. This is not particularly limited in this application.

It should be noted that, in this application, in S250, the access network device #A may further generate information #A based on the period #A, where the information #A can be used to determine the period #A.

For example, the information #A may be used to directly indicate the period #A. Specifically, the information #A indicates an absolute period, and the absolute period is the period #A. In this way, the terminal device #A may directly determine the period #A based on the information #A.

For another example, the information #A may be used to indirectly indicate the period #A. Specifically, the information #A may be used to indicate duration #A, where the duration #A may be duration of an interval between a moment #E and a specified reference moment. The moment #E may be a moment specified in the period #A. For example, the moment #E may be a starting moment of the period #A, or the moment #E may be an ending moment of the period #A, or the moment #E may be an intermediate moment of the period #A. In this way, the moment #E can be determined (in other words, calculated) based on the reference moment and the duration #A, thereby determining the period #A.

In one embodiment, before S250, the access network device #A may further perform a determining operation S230.

Specifically, in the embodiments of this application, in S230, the access network device #A may determine a relationship between duration (namely, an example of second duration, denoted as duration #W below for ease of understanding and description) of an interval between the current moment and the moment #A and a preset duration threshold #A (namely, an example of a first threshold), and determine, based on a determining result, whether to perform operation S250.

The duration threshold #A may be determined based on a transmission latency #A. The transmission latency #A may be a transmission latency between the access network device #A and the terminal device #A. Specifically, the transmission latency #A may be duration from sending a piece of information or a message by the access network device #A to receiving the information or the message by the terminal device #A.

For example, by way of example but not limitation, "the duration threshold #A may be determined based on a transmission latency #A" may mean that, the duration threshold #A may be determined only based on the transmission latency #A. For example, when it is ensured that the duration threshold #A is greater than or equal to the transmission latency #A, the duration threshold #A can be determined randomly.

For another example, by way of example but not limitation, "the duration threshold #A may be determined based on a transmission latency #A" may mean that, the duration threshold #A may be determined based on the transmission latency #A and another parameter, and by way of example but not limitation, the "another parameter" may include but is not limited to processing capability of the terminal device #A.

By way of example but not limitation, the "processing capability" may be a minimum time interval or maximum time interval or typical time interval at which a data packet of a particular size (for example, xx bytes) or in a particular size range (xx bytes to XX bytes) is transmitted from a physical layer entry to a transmission layer exit.

In the embodiments of this application, the access network device or the core network device may determine the processing capability of the terminal device based on reporting of the terminal device.

Specifically, the processing capability of the terminal device #A is used to indicate processing duration required by the terminal device #A to obtain, from a received signal that carries a data packet of a specified size, information in the data packet. For example, the processing capability of the terminal device #A may indicate time required by the terminal device #A to demodulate and decode the received signal, or the processing capability of the terminal device #A may indicate duration required by the terminal device #A to decapsulate the received data packet.

By way of example but not limitation, the processing time of the terminal device #A may be reported to the access network device or the core network device by the terminal device #A.

In addition, by way of example but not limitation, in the embodiments of this application, the duration threshold #A may be specified by the communications protocol, or the duration threshold #A may be determined by the administrator and entered to the access network device #A by the administrator, or the duration threshold #A may be determined by the access network device #A based on the foregoing parameter (for example, the transmission latency #A). This is not particularly limited in this application.

If the access network device #A can determine that the duration #W is greater than or equal to the duration threshold #A, it indicates that the data #α can be transmitted to the terminal device #A before the moment #A, so that the access network device #A can perform the action in S250, namely, sending the data #α and the information #A.

If the access network device #A can determine that the duration #W is less than the duration threshold #A, it indicates that the data #α cannot be transmitted to the terminal device #A before the moment #A, so that the access network device #A may not perform the action in S250, that is, the access network device #A may discard the data #α.

It should be noted that, in the embodiments of this application, the duration #W may be a positive value, may be zero, or may be a negative value. This is not particularly limited in this application. When the duration #W is a positive value, it indicates that the current moment is before the moment #A. When the duration #W is zero, it indicates that the current moment is the moment #A. When the duration #W is a negative value, it indicates that the current moment is after the moment #A.

In the communication method provided in the embodiments of this application, before sending the data, the transmit end device determines whether a relationship between the current moment and the first moment satisfies a preset condition, and determines, based on a determining result, whether to send the data, so that it can be ensured that the sent data reaches the receive end device before the first moment, thereby further improving the reliability and effects of the embodiments of this application.

It should be noted that, in S230, the access network device #A may also determine a relationship between the current moment and the period #A.

For example, the access network device #A may also determine duration (namely, another example of the duration #W) of an interval between the current moment and a moment #F specified in the period #A and a preset duration threshold #A (namely, an example of a first threshold), and determine, based on a determining result, whether to perform operation S250.

For example, the moment #F may be a starting moment of the period #A.

Alternatively, the moment #F may be an ending moment of the period #A.

Alternatively, the moment #F may be an intermediate moment of the period #A.

In S270, the terminal device #A may obtain the data #α and the information #A in the transmission layer.

For example, the terminal device #A may perform, at the protocol layer #A, decapsulation on the received data packet #A, to obtain the data #α and the information #A. The process may be similar to that in the prior art. Herein, to avoid repeated descriptions, detailed descriptions thereof are omitted.

In addition, the terminal device #A may determine the moment #A based on the information #A, and deliver, at the moment #A, the data #α from the transmission layer to the application layer, for example, a process or a thread corresponding to the application program #α, so that the application program #α can control the terminal device #A to perform the action corresponding to the data #α.

It should be noted that, when the information #A indicates the period #A, the terminal device #A may further determine the period #A based on the information #A, and deliver the data #α from the transmission layer to the application layer in the period #A.

It should be noted that, the moment #F and the moment #E may be a same moment, or may be different moments. This is not particularly limited in this application.

In the prior art, the receive end device immediately sends, after receiving data, the received data to the application layer. Therefore, the transmission latency has great impact on a receiving moment, severely affecting a moment when the receive end device performs an action corresponding to the data. On the contrary, in the communication method provided in the embodiments of this application, the transmit end device determines the first moment, where the first moment is the first moment when the receive end device needs to deliver the first data to the application layer; and sends, to the receive end device, the first indication information used to indicate the first moment and the first data. In this way, the receive end device can be supported in determining the first moment based on the first indication information and delivering the first data to the application layer at the first moment. Therefore, the receive end device can be supported in performing an action corresponding to the first data in the application layer at the first moment, thereby preventing the transmission latency from affecting execution by the receive end device of an action corresponding to the data.

Figure 3:
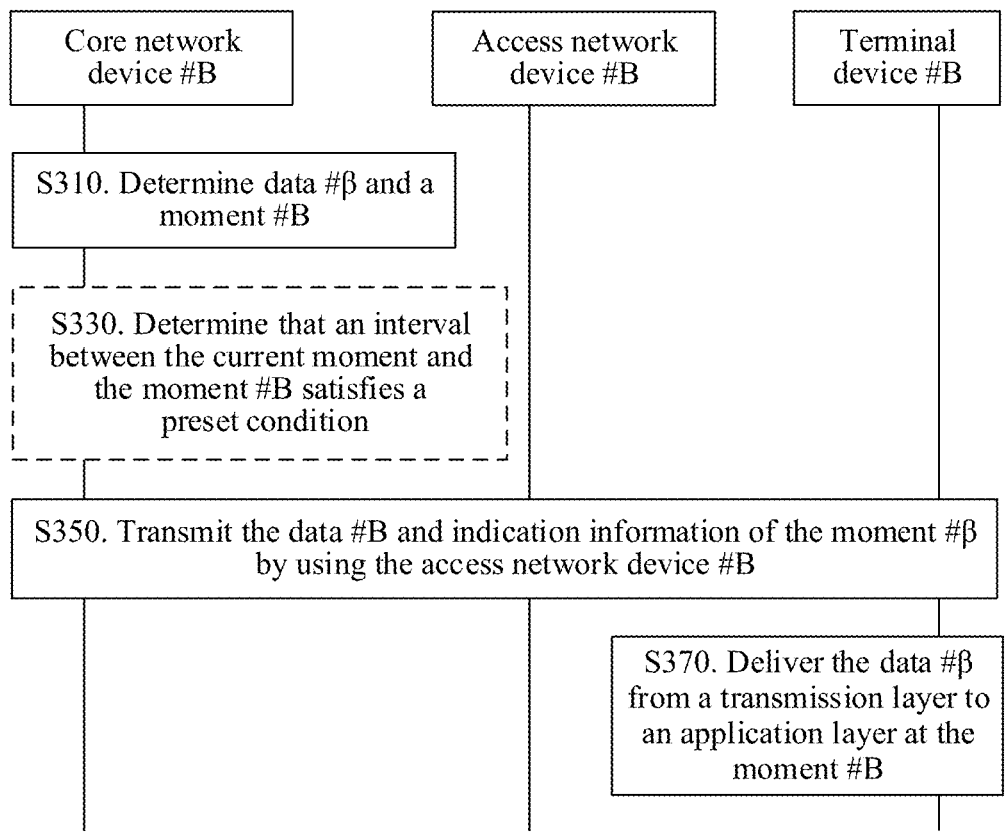
FIG. 3 is a schematic flowchart of another example of a communication method according to an embodiment of this application.

As shown in FIG. 3, a process of transmitting data #β (namely, an example of the first data) between a core network device #B (namely, another example of the transmit end device) and a terminal device #B (namely, another example of the receive end device) is described.

An application program #β may be installed in an application layer of the terminal device #B, and the application program #β can perform, after the data #β is entered, an action corresponding to the data #β. For example, the terminal device #B may be an industrial robot, and the data #β may be an operation instruction controlling an action of the robot, so that the application program #β can control, after the data #β is entered, the robot to perform an action instructed by the operation instruction. It should be understood that, the listed specific examples of the terminal device #B are merely examples for description, and this application is not limited thereto. The terminal device #B may alternatively be a mobile phone, a smart appliance, or any terminal device that has a communication function, can be installed with an application program, and can implement the function by using the application program.

In S310, the core network device #B may obtain the data #β.

For example, a server of the application program #β may be communicatively connected (for example, in a wired communication connection or a wireless communication connection) to the core network device #B. In this way, the server can send the data #β to the core network device #B. Moreover, the data #β may be entered to the server by a designer of the operation instruction, or the server may generate the data #β based on a preset algorithm. This is not particularly limited in this application.

In addition, in S310, the core network device #B may determine a moment #B, where the moment #B is a moment when the terminal device #B needs to transmit the data #β from the transmission layer of the terminal device #β. (for example, a communications protocol stack in the device #B) to the application layer (specifically, the foregoing application program #β) of the terminal device #B. Alternatively, the moment #B may be a moment when the terminal device #B performs the processing corresponding to the data #β.

By way of example but not limitation, in the embodiments of this application, the server of the application program #α may be communicatively connected (for example, in a wired communication connection or a wireless communication connection) to the core network device #B.

In this way, the server may send indication information of the moment #B to the core network device #B. That is, the core network device #B may determine the moment #B based on an indication from the server.

By way of example but not limitation, the moment #B may be entered to the server by a designer of the operation instruction, or the server may obtain the moment #B through calculation based on a preset algorithm. Description of a same or similar situation is omitted below.

It should be understood that, the listed manners of determining the moment #B by the core network device #B are merely examples for description, and this application is not limited thereto. For example, the administrator or the designer of the operation instruction may enter information of the moment #B to the core network device #B, so that the core network device #B can determine the moment #B based on the entered information.

It should be noted that, processes of determining the data #β and the moment #B by the core network device #B may be performed simultaneously, or may be performed in different operations. This is not particularly limited in this application.

In S350, the core network device #B may generate information #B (namely, another example of first indication information) based on the moment #B, where the information #B can be used to determine the moment #B.

By way of example but not limitation, the information #B may include any one of the following indication manners:

Indication Manner 3

In one embodiment, the information #B may be used to directly indicate the moment #B. Specifically, the information #B indicates an absolute moment, and the absolute moment is the moment #B. In this way, the terminal device #B may directly determine the moment #B based on the information #B.

Indication Manner 4

In one embodiment, the information #B may be used to indirectly indicate the moment #B. Specifically, the information #B may be used to indicate duration #B, where the duration #B may be duration of an interval between the moment #B and a specified reference moment. In this way, the moment #B can be determined (in other words, calculated) based on the reference moment and the duration #B.

By way of example but not limitation, in the embodiments of this application, any one of the following moments may be used as the reference moment.

a. A moment (denoted as: moment #3 below for ease of understanding and description) when the core network device #B receives the data #β. Specifically, in the embodiments of this application, a data packet sent by the core network device (for example, via an access network device) to the terminal device may carry a moment when the core network device receives (for example, from a server) data carried in the data packet. In this way, based on the foregoing mechanism, the terminal device #B can determine the moment #3 from the data packet that carries the data #β, and use the moment #3 as the reference moment. In this way, in the communication method according to the embodiments of this application, the moment #3 is used as the reference moment, so that the receive end device can easily learn of the moment when the transmit end device obtains the data, and the receive end device can easily learn of the moment when the data needs to be delivered from the transmission layer to the application layer.

b. A moment (denoted as: moment #4 below for ease of understanding and description) when the core network device #B sends the data #β. Specifically, in the embodiments of this application, the data packet sent by the core network device (for example, via an access network device) to the terminal device may carry a moment when the core network device sends the data packet. In this way, based on the foregoing mechanism, the terminal device #B can determine the moment #4 from the data packet that carries the data #β, and use the moment #4 as the reference moment. In this way, in the communication method according to the embodiments of this application, the moment #4 is used as the reference moment, so that the receive end device can easily learn of the moment when the transmit end device sends the data, and the receive end device can easily learn of the moment when the data needs to be delivered from the transmission layer to the application layer.

It should be understood that, the listed specific moments used as the reference moment are merely examples for description, and this application is not limited thereto. Any moment before the moment #B may be used as the reference moment, provided that the reference moments determined by the core network device #B and the terminal device #B are consistent. For example, the reference moment may alternatively be a moment when a user performs entering on the core network device #B and the terminal device #B.

Then, the core network device #B may send the data #β and the information #B to the access network device, and the access network device may forward the data #β and the information #B to the terminal device #B.

By way of example but not limitation, in the embodiments of this application, the core network device #B may send the data #β and the information #B in the following manner.

In one embodiment, the core network device #B may perform, at a protocol layer #B (namely, an example of the second protocol layer) in the transmission layer, encapsulation on the data #β and the information #B, to generate a data packet #B (namely, an example of the second data packet), and send the data packet #B to the access network device #B. In addition, the access network device #B may forward (for example, transparently transmit) the data packet #B to the terminal device #B.

In this way, the terminal device #B may perform, at the protocol layer #B, decapsulation on the data packet #B, to obtain the data #β and the information #B.

Herein, the protocol layer #B may include some protocol layers (for example, one or more protocol layers) or all protocol layers in a protocol stack that is configured in the core network device #B and the terminal device #B and that is used to implement data exchange between the core network device #B and the terminal device #B.

By way of example but not limitation, the protocol layer #B may include a non-access stratum (NAS).

It should be understood that, the listed specific protocol layers that the protocol layer #B includes are merely examples for description, and this application is not limited thereto. Other protocol layers included in the protocol stack that can be used for data exchange between the core network device and the terminal device all fall into the protection scope of the embodiments of this application.

In addition, the specific process and method of the foregoing encapsulation may be similar to the prior art. Herein, to avoid repeated descriptions, detailed descriptions thereof are omitted.

The data #β and the information #B are encapsulated in the same data packet, so that the data #β and the information #B can be both transmitted in a single transmission process, thereby improving communication efficiency and reducing communication resources and signaling.

In addition, in the embodiments of this application, the information #B may have a specified format, so that after receiving the information #B, the terminal device #B can identify, based on the format of the information #B, a moment when the information #B is used to instruct (directly instruct or indirectly instruct) the data to be delivered to the application layer. The "specified format" may be specified by the communications protocol, or the "specified format" may be determined through negotiation between the core network device and the terminal device. This is not particularly limited in this application.

Alternatively, the information #B may be carried in a specified message or field, so that the terminal device #B can identify, based on the message carrying the information #B or the field carrying the information #B, a moment when the information #B is used to instruct (directly instruct or indirectly instruct) the data to be delivered to the application layer. The "specified message or field" may be specified by the communications protocol, or the "specified message or field" may be determined through negotiation between the core network device and the terminal device. This is not particularly limited in this application.

In one embodiment, before S350, the core network device #B may further perform a determining operation S330.

Specifically, in the embodiments of this application, in S330, the core network device #B may determine duration (namely, an example of second duration, denoted as duration #X below for ease of understanding and description) of an interval between the current moment and the moment #B and a preset duration threshold #B (namely, another example of the first threshold), and determine, based on a determining result, whether to perform operation S350.

The duration threshold #B may be determined based on a transmission latency #B. The transmission latency #B may be a transmission latency between the core network device #B and the terminal device #B. Specifically, the transmission latency #B may be duration from sending a piece of information or a message by the core network device #B to receiving the information or the message by the terminal device #B. By way of example but not limitation, the transmission latency #B may include a transmission latency between the core network device #B and the access network device #B, and a transmission latency between the access network device #B and the terminal device #B.

For example, by way of example but not limitation, "the duration threshold #B may be determined based on a transmission latency #B" may mean that, the duration threshold #B may be determined only based on the transmission latency #B. For example, when it is ensured that the duration threshold #B is greater than or equal to the latency #B, the duration threshold #B can be determined randomly.

For another example, by way of example but not limitation, "the duration threshold #B may be determined based on a transmission latency #B" may mean that, the duration threshold #B may be determined based on the transmission latency #B and another parameter, and by way of example but not limitation, the "another parameter" may include but is not limited to processing capability of the terminal device #B, for example, processing duration required for obtaining information from a received signal, for example, duration required by the terminal device #B to demodulate and decode the received signal. Explanations of the processing capability of the terminal device #B may similar to the foregoing explanations of the processing capability of the terminal device #A. Herein, to avoid repeated descriptions, detailed descriptions thereof are omitted.

By way of example but not limitation, in the embodiments of this application, the duration threshold #B may be specified by the communications protocol, or the duration threshold #B may be determined by the administrator and entered to the core network device #B by the administrator, or the duration threshold #B may be determined by the core network device #B based on the foregoing parameter (for example, the transmission latency #B). This is not particularly limited in this application.

If the core network device #B can determine that the duration #X is greater than or equal to the duration threshold #B, it indicates that the data #β can be transmitted to the terminal device #B before the moment #B, so that the core network device #B can perform the action in S350, namely, sending the data #β and the information #B.

If the core network device #B can determine that the duration #X is less than the duration threshold #B, it indicates that the data #β cannot be transmitted to the terminal device #B before the moment #B, so that the core network device #B may not perform the action in S350, that is, the core network device #B may discard the data #β.

It should be noted that, in the embodiments of this application, the duration #X may be a positive value, may be zero, or may be a negative value. This is not particularly limited in this application. When the duration #X is a positive value, it indicates that the current moment is before the moment #B. When the duration #X is zero, it indicates that the current moment is the moment #B. When the duration #X is a negative value, it indicates that the current moment is after the moment #B.

In the communication method provided in the embodiments of this application, before sending the data, the transmit end device determines whether a relationship between the current moment and the first moment satisfies a preset condition, and determines, based on a determining result, whether to send the data, so that it can be ensured that the sent data reaches the receive end device before the first moment, thereby further improving the reliability and effects of the embodiments of this application.

In S370, the terminal device #B may obtain the data #β and the information #B in the transmission layer.

For example, the terminal device #B may perform, at the protocol layer #B, decapsulation on the received data packet #B, to obtain the data #β and the information #B. The process may be similar to that in the prior art. Herein, to avoid repeated descriptions, detailed descriptions thereof are omitted.

In addition, the terminal device #B may determine the moment #B based on the information #B, and deliver, at the moment #B, the data #β from the transmission layer to the application layer, for example, a process or a thread corresponding to the application program #β, so that the application program #β can control the terminal device #B to perform the action corresponding to the data #β.

It should be noted that, in the embodiments of this application, communication between the terminal device #B and the core network device #B may be performed through the access network device #B. A communications protocol (in other words, a protocol stack) used for communication between the core network device #B and the access network device #B may be different from a communications protocol (in other words, a protocol stack) used for communication between the terminal device #B and the access network device #B, so that the core network device #B can decapsulate (in other words, parse) a signal from the core network device #B (namely, a signal that satisfies a requirement of the communications protocol between the core network device #B and the access network device #B), and encapsulate obtained data or information into a signal that the terminal device #B can receive and identify (namely, a signal that satisfies a requirement of the communications protocol between the terminal device #B and the access network device #B).

In the prior art, the receive end device immediately sends, after receiving data, the received data to the application layer. Therefore, the transmission latency has great impact on a receiving moment, severely affecting a moment when the receive end device performs an action corresponding to the data. On the contrary, in the communication method provided in the embodiments of this application, the transmit end device determines the first moment, where the first moment is the first moment when the receive end device needs to deliver the first data to the application layer; and sends, to the receive end device, the first indication information used to indicate the first moment and the first data. In this way, the receive end device can be supported in determining the first moment based on the first indication information and delivering the first data to the application layer at the first moment. Therefore, the receive end device can be supported in performing an action corresponding to the first data in the application layer at the first moment, thereby preventing the transmission latency from affecting execution by the receive end device of an action corresponding to the data.

It should be noted that, in this application, in S310, the core network device #B may determine a period #B. By way of example but not limitation, the access network device #B may determine the period #B based on the moment #B.

For example, duration of the period #B may be specified by a communications system or a communications protocol.

Alternatively, the duration of the period #B may be determined and indicated to the terminal device by a network device.

In addition, a location of the moment #B in the period #B may be specified by the communications system or the communications protocol.

Alternatively, the location of the moment #B in the period #B may be determined and indicated to the terminal device by the network device.

For example, the moment #B may be a starting moment of the period #B.

Alternatively, the moment #B may be an ending moment of the period #B.

Alternatively, the moment #B may be an intermediate moment of the period #B.

In addition, in this application, in S350, the core network device #B may generate information #B based on the period #B, where the information #B can be used to determine the period #B.

For example, the information #B may be used to directly indicate the period #B. Specifically, the information #B indicates an absolute period, and the absolute period is the period #B. In this way, the terminal device #B may directly determine the period #B based on the information #B.

For another example, the information #B may be used to indirectly indicate the period #B. Specifically, the information #B may be used to indicate duration #B, where the duration #B may be duration of an interval between a moment #G and a specified reference moment. The moment #G may be a moment specified in the period #B. For example, the moment #G may be a starting moment of the period #B, or the moment #G may be an ending moment of the period #B, or the moment #G may be an intermediate moment of the period #B. In this way, the moment #G can be determined (in other words, calculated) based on the reference moment and the duration #B, thereby determining the period #B.

It should be noted that, in S330, the core network device #B may also determine a relationship between the current moment and the period #B.

For example, the core network device #B may also determine duration (namely, another example of the duration #X) of an interval between the current moment and a moment #H specified in the period #B and a preset duration threshold #B, and determine, based on a determining result, whether to perform operation S350.

For example, the moment #H may be a starting moment of the period #B.

Alternatively, the moment #H may be an ending moment of the period #B.

Alternatively, the moment #H may be an intermediate moment of the period #B.

In addition, when the information #B indicates the period #B, the terminal device #B may further determine the period

B based on the information #B, and deliver the data #β from the transmission layer to the application layer in the period #B.

It should be noted that, the moment #H and the moment #G may be a same moment, or may be different moments. This is not particularly limited in this application.

Figure 4:
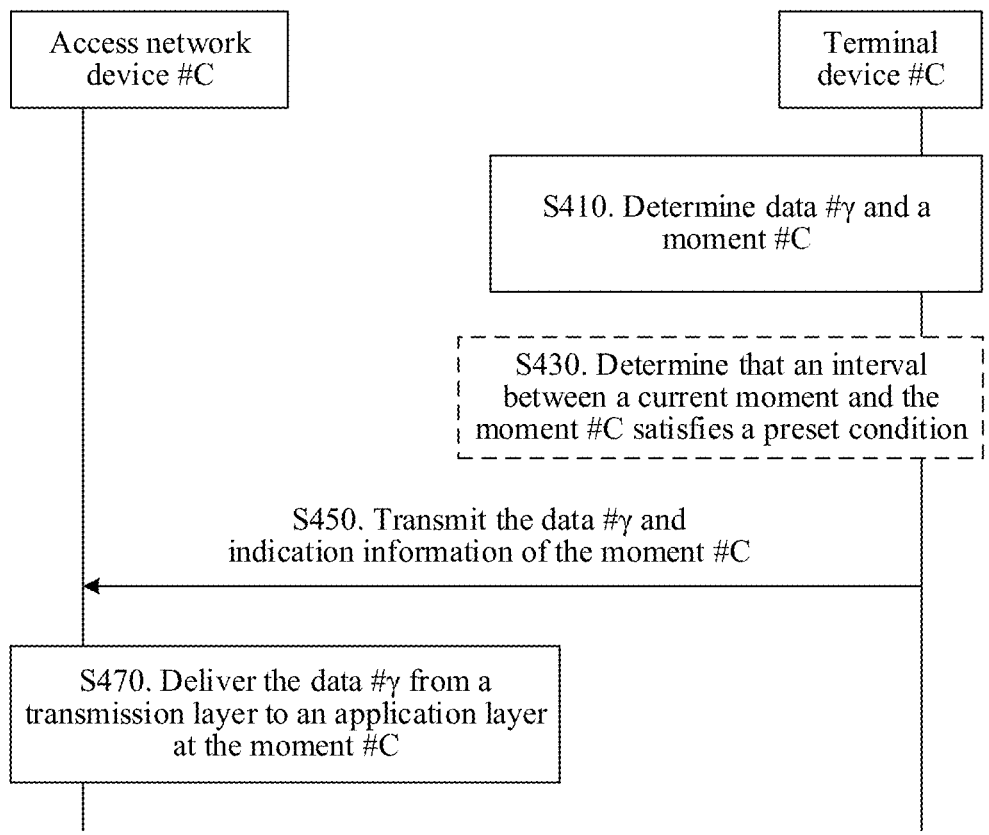
FIG. 4 is a schematic flowchart of still another example of a communication method according to an embodiment of this application.

As shown in FIG. 4, a process of transmitting data #γ (namely, an example of the first data) between a terminal device #C (namely, an example of the transmit end device) and an access network device #C (namely, an example of the receive end device) is described.

An application program #γ may be installed in an application layer of the access network device #C, and the application program #γ can perform, after the data #γ is entered, an action corresponding to the data #γ.

In S410, the terminal device #C may obtain the data #γ.

For example, an administrator or a designer of the operation instruction may enter the data #γ into the access network device #C, or the terminal device #C may alternatively generate the data #γ based on a preset algorithm.

In addition, in S410, the terminal device #C may determine a moment #C, where the moment #C is a moment when the access network device #C needs to transmit the data #γ from the transmission layer of the terminal device #C (for example, a communications protocol stack in the terminal device #C) to the application layer (specifically, the foregoing application program #γ) of the terminal device #C. Alternatively, the moment #C may be a moment when the terminal device #C performs the processing corresponding to the data #γ.

By way of example but not limitation, in the embodiments of this application, the moment #C may be entered to the terminal device #C by a designer of the operation instruction, or the terminal device #C may obtain the moment #C through calculation based on a preset algorithm.

It should be noted that, processes of determining the data #γ and the moment #C by the terminal device #C may be performed simultaneously, or may be performed in different operations. This is not particularly limited in this application.

In S350, the access network device #C may generate information #C (namely, an example of first indication information) based on the moment #C, where the information #C can be used to determine the moment #C.

By way of example but not limitation, the information #C may include any one of the following indication manners:

Indication Manner 5

In one embodiment, the information #C may be used to directly indicate the moment #C. Specifically, the information #C indicates an absolute moment, and the absolute moment is the moment #C. In this way, the terminal device #C may directly determine the moment #C based on the information #C.

Indication Manner 6

In one embodiment, the information #C may be used to indirectly indicate the moment #C. Specifically, the information #C may be used to indicate duration #C, where the duration #C may be duration of an interval between the moment #C and a specified reference moment. In this way, the moment #C can be determined (in other words, calculated) based on the reference moment and the duration #C.

By way of example but not limitation, in the embodiments of this application, a moment (denoted as moment #5 below for ease of understanding and description) when the terminal device #C sends the data #γ may be used as the reference moment.

Specifically, in the embodiments of this application, a data packet sent by the terminal device to the access network device may carry a moment when the terminal device sends the data packet. In this way, based on the foregoing mechanism, the access network device #C can determine the moment #5 from the data packet that carries the data #γ, and use the moment #5 as the reference moment. In this way, in the communication method according to the embodiments of this application, the moment #5 is used as the reference moment, so that the receive end device can easily learn of the moment when the transmit end device sends the data, and the receive end device can easily learn of the moment when the data needs to be delivered from the transmission layer to the application layer.

It should be understood that, the listed specific moments used as the reference moment are merely examples for description, and this application is not limited thereto. Any moment before the moment #C may be used as the reference moment, provided that the reference moments determined by the access network device #C and the terminal device #C are consistent. For example, the reference moment may alternatively be a moment when a user performs entering on the access network device #C and the terminal device #C. For another example, the reference moment may alternatively be a moment when the terminal device #C accesses the access network device #C.

Then, the terminal device #C may send the data #γ and the information #C to the access network device #C.

By way of example but not limitation, in the embodiments of this application, the terminal device #C may send the data #γ and the information #C in the following manner.

In one embodiment, the terminal device #C may perform, at a protocol layer #C (namely, an example of the first protocol layer) in the transmission layer, encapsulation on the data #γ and the information #C, to generate a data packet #C (namely, an example of the first data packet), and send the data packet #C to the access network device #C.

In this way, the access network device #C may perform, at the protocol layer #C, decapsulation on the data packet #C, to obtain the data #γ and the information #C.

Herein, the protocol layer #C may include some protocol layers (for example, one or more protocol layers) or all protocol layers in a protocol stack that is configured in the access network device #C and the terminal device #C and that is used to implement wireless communication between the access network device #C and the terminal device #C.

By way of example but not limitation, the protocol layer #C may include one or more protocol layers of the foregoing PHY layer, MCC layer, RLC layer, PDCP layer, or RRC layer.

It should be understood that, the listed specific protocol layers that the protocol layer #C includes are merely examples for description, and this application is not limited thereto. Other protocol layers included in the protocol stack that can be used for wireless communication between the access network device and the terminal device all fall into the protection scope of the embodiments of this application.

In addition, the specific process and method of the foregoing encapsulation may be similar to the prior art. Herein, to avoid repeated descriptions, detailed descriptions thereof are omitted.

The data #γ and the information #C are encapsulated in the same data packet, so that the data #γ and the information #C can be both transmitted in a single transmission process, thereby improving communication efficiency and reducing communication resources and signaling.

In addition, in the embodiments of this application, the information #C may have a specified format, so that after receiving the information #C, the access network device #C can identify, based on the format of the information #C, a moment when the information #C is used to instruct (directly instruct or indirectly instruct) the data to be delivered to the application layer. The "specified format" may be specified by the communications protocol, or the "specified format" may be determined through negotiation between the access network device and the terminal device. This is not particularly limited in this application.

Alternatively, the information #C may be carried in a specified message or field, so that the access network device #C can identify, based on the message carrying the information #C or the field carrying the information #C, a moment when the information #C is used to instruct (directly instruct or indirectly instruct) the data to be delivered to the application layer. The "specified message or field" may be specified by the communications protocol, or the "specified message or field" may be determined through negotiation between the access network device and the terminal device. This is not particularly limited in this application.

In one embodiment, before S450, the terminal device #C may further perform a determining operation S430.

Specifically, in the embodiments of this application, in S430, the terminal device #C may determine duration (namely, an example of second duration, denoted as duration #Y below for ease of understanding and description) of an interval between the current moment and the moment #C and a preset duration threshold #C (namely, an example of a first threshold), and determine, based on a determining result, whether to perform operation S450.

The duration threshold #C may be determined based on a transmission latency #C. The transmission latency #C may be a transmission latency between the access network device #C and the terminal device #C. Specifically, the transmission latency #C may be duration from sending a piece of information or a message by the terminal device #C to receiving the information or the message by the access network device #C.

For example, by way of example but not limitation, "the duration threshold #C may be determined based on a transmission latency #C" may mean that, the duration threshold #C may be determined only based on the transmission latency #C. For example, when it is ensured that the duration threshold #C is greater than or equal to the latency #C, the duration threshold #C can be determined randomly.

For another example, by way of example but not limitation, "the duration threshold #C may be determined based on a transmission latency #C" may mean that, the duration threshold #C may be determined based on the transmission latency #C and another parameter, and by way of example but not limitation, the "another parameter" may include but is not limited to processing duration required by the access network device #C to obtain information from a received signal, for example, duration required by the access network device #C to demodulate and decode the received signal.

By way of example but not limitation, in the embodiments of this application, the duration threshold #C may be specified by the communications protocol, or the duration threshold #C may be determined by the administrator and entered to the terminal device #C by the administrator, or the duration threshold #C may be determined by the terminal device #C based on the foregoing parameter (for example, the transmission latency #C). This is not particularly limited in this application.

If the terminal device #C can determine that the duration #Y is greater than or equal to the duration threshold #C, it indicates that the data #γ can be transmitted to the access network device #C before the moment #C, so that the terminal device #C can perform the action in S450, namely, sending the data #γ and the information #C.

If the terminal device #C can determine that the duration #Y is less than the duration threshold #C, it indicates that the data #γ cannot be transmitted to the access network device #C before the moment #C, so that the terminal device #C may not perform the action in S450, that is, the terminal device #C may discard the data #γ.

It should be noted that, in the embodiments of this application, the duration #Y may be a positive value, may be zero, or may be a negative value. This is not particularly limited in this application. When the duration #Y is a positive value, it indicates that the current moment is before the moment #C. When the duration #Y is zero, it indicates that the current moment is the moment #C. When the duration #Y is a negative value, it indicates that the current moment is after the moment #C.

In the communication method provided in the embodiments of this application, before sending the data, the transmit end device determines whether a relationship between the current moment and the first moment satisfies a preset condition, and determines, based on a determining result, whether to send the data, so that it can be ensured that the sent data reaches the receive end device before the first moment, thereby further improving the reliability and effects of the embodiments of this application.

In S470, the access network device #C may obtain the data #γ and the information #C in the transmission layer.

For example, the access network device #C may perform, at the protocol layer #C, decapsulation on the received data packet #C, to obtain the data #γ and the information #C. The process may be similar to that in the prior art. Herein, to avoid repeated descriptions, detailed descriptions thereof are omitted.

In addition, the access network device #C may determine the moment #C based on the information #C, and deliver, at the moment #C, the data #γ from the transmission layer to the application layer, for example, a process or a thread corresponding to the application program #γ, so that the application program #γ can control the terminal device #C to perform the action corresponding to the data #γ.

It should be noted that, in this application, in S410, the terminal device #C may determine a period #C. By way of example but not limitation, the terminal device #C may determine the period #C based on the moment #C.

For example, duration of the period #C may be specified by a communications system or a communications protocol.

Alternatively, the duration of the period #C may be determined and indicated to the terminal device by a network device.

In addition, a location of the moment #C in the period #C may be specified by the communications system or the communications protocol.

Alternatively, the location of the moment #C in the period #C may be determined and indicated to the terminal device by the network device.

For example, the moment #C may be a starting moment of the period #C.

Alternatively, the moment #C may be an ending moment of the period #C.

Alternatively, the moment #C may be an intermediate moment of the period #C.

In addition, in this application, in S450, the terminal device #C may also generate information #C based on the period #C, where the information #C can be used to determine the period #C.

For example, the information #C may be used to directly indicate the period #C. Specifically, the information #C indicates an absolute period, and the absolute period is the period #C. In this way, the access network device #C may directly determine the period #C based on the information #C.

For another example, the information #C may be used to indirectly indicate the period #C. Specifically, the information #C may be used to indicate duration #C, where the duration #C may be duration of an interval between a moment #J and a specified reference moment. The moment #J may be a moment specified in the period #C. For example, the moment #J may be a starting moment of the period #C, or the moment #J may be an ending moment of the period #C, or the moment #J may be an intermediate moment of the period #C. In this way, the moment #J can be determined (in other words, calculated) based on the reference moment and the duration #C, thereby determining the period #C.

It should be noted that, in S430, the terminal device #C may also determine a relationship between the current moment and the period #C.

For example, the terminal device #C may also determine duration (namely, another example of the duration #Y) of an interval between the current moment and a moment #K specified in the period #C and a preset duration threshold #C, and determine, based on a determining result, whether to perform operation S450.

For example, the moment #K may be a starting moment of the period #C.

Alternatively, the moment #K may be an ending moment of the period #C.

Alternatively, the moment #K may be an intermediate moment of the period #C.

In addition, when the information #C indicates the period #C, the access network device #C may further determine the period #C based on the information #C, and deliver the data #γ from the transmission layer to the application layer in the period #C.

It should be noted that, the moment #K and the moment #J may be a same moment, or may be different moments. This is not particularly limited in this application.

In the prior art, the receive end device immediately sends, after receiving data, the received data to the application layer. Therefore, the transmission latency has great impact on a receiving moment, severely affecting a moment when the receive end device performs an action corresponding to the data. On the contrary, in the communication method provided in the embodiments of this application, the transmit end device determines the first moment, where the first moment is the first moment when the receive end device needs to deliver the first data to the application layer; and sends, to the receive end device, the first indication information used to indicate the first moment and the first data. In this way, the receive end device can be supported in determining the first moment based on the first indication information and delivering the first data to the application layer at the first moment. Therefore, the receive end device can be supported in performing an action corresponding to the first data in the application layer at the first moment, thereby preventing the transmission latency from affecting execution by the receive end device of an action corresponding to the data.

Figure 5:
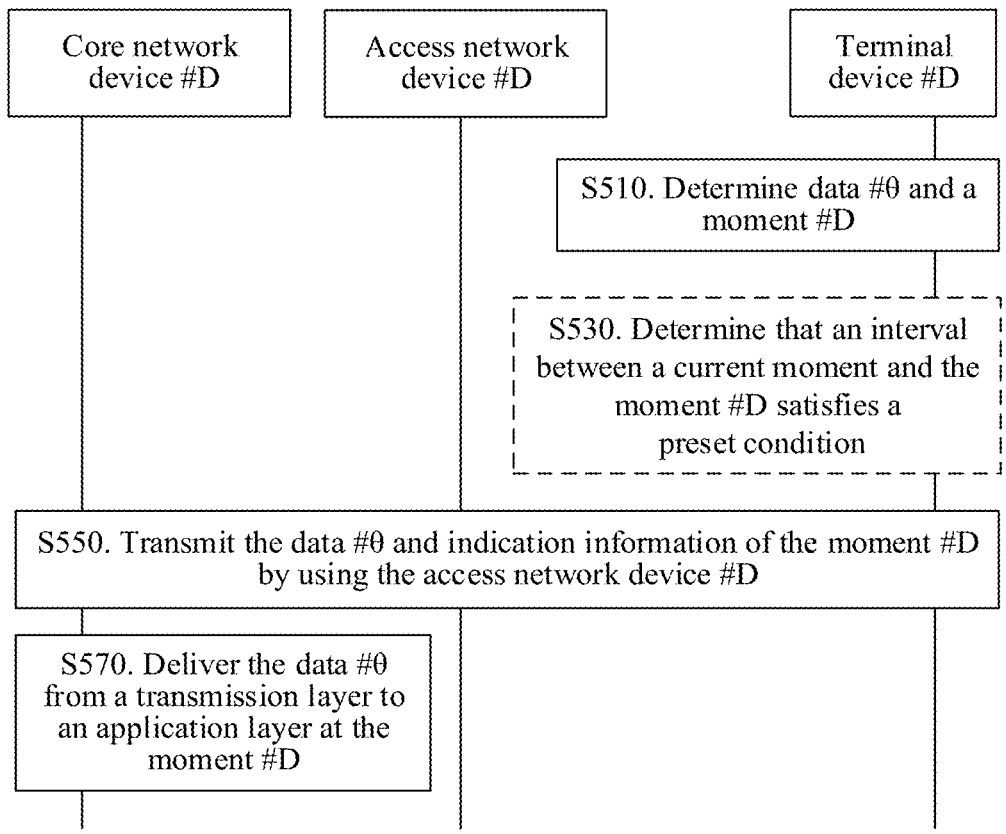
FIG. 5 is a schematic flowchart of still another example of a communication method according to an embodiment of this application.

As shown in FIG. 5, a process of transmitting data #θ (namely, an example of the first data) between a terminal device #D (namely, another example of the transmit end device) and a core network device #D (namely, another example of the receive end device) is described.

An application program #θ may be installed in an application layer of the core network device #D, and the application program #θ can perform, after the data #θ is entered, an action corresponding to the data #θ.

In S510, the terminal device #D may obtain the data #θ.

For example, the data #θ may be entered to the terminal device #D by a designer of the operation instruction, or the terminal device #D may generate the data #θ based on a preset algorithm. This is not particularly limited in this application.

In addition, in S510, the terminal device #D may determine a moment #D, where the moment #D is a moment when the core network device #D needs to transmit the data #θ from the transmission layer of the core network device #D (for example, a communications protocol stack in the core network device #D) to the application layer (specifically, the foregoing application program #θ) of the core network device #D. In other words, the moment #D may be a moment when the core network device #D performs processing corresponding to the data #θ.

For example, the moment #D may be entered to the terminal device #D by a designer of the operation instruction, or the terminal device #D may obtain the moment #D through calculation based on a preset algorithm. This is not particularly limited in this application.

It should be noted that, processes of determining the data #θ and the moment #D by the terminal device #D may be performed simultaneously, or may be performed in different operations. This is not particularly limited in this application.

In S550, the terminal device #D may generate information #D (namely, another example of first indication information) based on the moment #D, where the information #D may be used to determine the moment #D.

By way of example but not limitation, the information #D may include any one of the following indication manners:

Indication Manner 7

In one embodiment, the information #D may be used to directly indicate the moment #D. Specifically, the information #D indicates an absolute moment, and the absolute moment is the moment #D. In this way, the terminal device #D may directly determine the moment #D based on the information #D.

Indication Manner 8

In one embodiment, the information #D may be used to indirectly indicate the moment #D. Specifically, the information #D may be used to indicate duration #D, where the duration #D may be duration of an interval between the moment #D and a specified reference moment. In this way, the moment #D can be determined (in other words, calculated) based on the reference moment and the duration #D.

By way of example but not limitation, in the embodiments of this application, a moment (denoted as moment #6 below for ease of understanding and description) when the terminal device #D sends the data #θ may be used as the reference moment.

Specifically, in the embodiments of this application, the data packet sent by the terminal device (for example, via an access network device) to the core network device may carry a moment when the terminal device sends the data packet. In this way, based on the foregoing mechanism, the core network device #D can determine the moment #6 from the data packet that carries the data #θ, and use the moment #6 as the reference moment. In this way, in the communication method according to the embodiments of this application, the moment #6 is used as the reference moment, so that the receive end device can easily learn of the moment when the transmit end device sends the data, and the receive end device can easily learn of the moment when the data needs to be delivered from the transmission layer to the application layer.

It should be understood that, the listed specific moments used as the reference moment are merely examples for description, and this application is not limited thereto. Any moment before the moment #D may be used as the reference moment, provided that the reference moments determined by the core network device #D and the terminal device #D are consistent. For example, the reference moment may alternatively be a moment when a user performs entering on the core network device #D and the terminal device #D.

Then, the terminal device #D may send the data #θ and the information #D to the access network device, and the access network device may forward the data #θ and the information #D to the terminal device #D.

By way of example but not limitation, in the embodiments of this application, the terminal device #D may send the data #θ and the information #D in the following manner.

In one embodiment, the terminal device #D may perform, at a protocol layer #D (namely, an example of the second protocol layer) in the transmission layer, encapsulation on the data #θ and the information #D, to generate a data packet #D (namely, an example of the second data packet), and send the data packet #D to the access network device #D. In addition, the access network device #D may forward (for example, transparently transmit) the data packet #D to the core network device #D.

In this way, the core network device #D may perform, at the protocol layer #D, decapsulation on the data packet #D, to obtain data the #θ and the information #D.

Herein, the protocol layer #D may include some protocol layers (for example, one or more protocol layers) or all protocol layers in a protocol stack that is configured in the core network device #D and the terminal device #D and that is used to implement data exchange between the core network device #D and the terminal device #D.

By way of example but not limitation, the protocol layer #D may include a NAS layer.

It should be understood that, the listed specific protocol layers that the protocol layer #D includes are merely examples for description, and this application is not limited thereto. Other protocol layers included in the protocol stack that can be used for data exchange between the core network device and the terminal device all fall into the protection scope of the embodiments of this application.

In addition, the specific process and method of the foregoing encapsulation may be similar to the prior art. Herein, to avoid repeated descriptions, detailed descriptions thereof are omitted.

The data #θ and the information #D are encapsulated in the same data packet, so that the data #θ and the information #D can be both transmitted in a single transmission process, thereby improving communication efficiency and reducing communication resources and signaling.

In addition, in the embodiments of this application, the information #D may have a specified format, so that after receiving the information #D, the core network device #D can identify, based on the format of the information #D, a moment when the information #D is used to instruct (directly instruct or indirectly instruct) the data to be delivered to the application layer. The "specified format" may be specified by the communications protocol, or the "specified format" may be determined through negotiation between the core network device and the terminal device. This is not particularly limited in this application.

Alternatively, the information #D may be carried in a specified message or field, so that the core network device #D can identify, based on the message carrying the information #D or the field carrying the information #D, a moment when the information #D is used to instruct (directly instruct or indirectly instruct) the data to be delivered to the application layer. The "specified message or field" may be specified by the communications protocol, or the "specified message or field" may be determined through negotiation between the core network device and the terminal device. This is not particularly limited in this application.

In one embodiment, before S550, the core network device #D may further perform a determining operation S530.

Specifically, in the embodiments of this application, in S530, the terminal device #D may determine duration (namely, an example of second duration, denoted as duration #Z below for ease of understanding and description) of an interval between the current moment and the moment #D and a preset duration threshold #D (namely, another example of the first threshold), and determine, based on a determining result, whether to perform operation S550.

The duration threshold #D may be determined based on a transmission latency #D. The transmission latency #D may be a transmission latency between the core network device #D and the terminal device #D. Specifically, the transmission latency #D may be duration from sending a piece of information or a message by the terminal device #D to receiving the information or the message by the core network device #D. By way of example but not limitation, the transmission latency #D may include a transmission latency between the core network device #D and the access network device #D, and a transmission latency between the access network device #D and the terminal device #D.

For example, by way of example but not limitation, "the duration threshold #D may be determined based on a transmission latency #D" may mean that, the duration threshold #D may be determined only based on the transmission latency #D. For example, when it is ensured that the duration threshold #D is greater than or equal to the latency #D, the duration threshold #D can be determined randomly.

For another example, by way of example but not limitation, "the duration threshold #D may be determined based on a transmission latency #D" may mean that, the duration threshold #D may be determined based on the transmission latency #D and another parameter, and by way of example but not limitation, the "another parameter" may include but is not limited to processing duration required by the core network device #D to obtain information from a received signal, for example, duration required by the core network device #D to demodulate and decode the received signal.

By way of example but not limitation, in the embodiments of this application, the duration threshold #D may be specified by the communications protocol, or the duration threshold #D may be determined by the administrator and entered to the core network device #D by the administrator, or the duration threshold #D may be determined by the core network device #D based on the foregoing parameter (for example, the transmission latency #D). This is not particularly limited in this application.

If the terminal device #D can determine that the duration #Z is greater than or equal to the duration threshold #D, it indicates that the data #θ can be transmitted to the core network device #D before the moment #D, so that the terminal device #D can perform the action in S550, namely, sending the data #θ and the information #D.

If the terminal device #D can determine that the duration #Z is less than the duration threshold #D, it indicates that the data #θ cannot be transmitted to the core network device #D before the moment #D, so that the terminal device #D may not perform the action in S250, that is, the terminal device #D may discard the data #θ.

It should be noted that, in the embodiments of this application, the duration #Z may be a positive value, may be zero, or may be a negative value. This is not particularly limited in this application. When the duration #Z is a positive value, it indicates that the current moment is before the moment #D. When the duration #Z is zero, it indicates that the current moment is the moment #D. When the duration #Z is a negative value, it indicates that the current moment is after the moment #D.

In the communication method provided in the embodiments of this application, before sending the data, the transmit end device determines whether a relationship between the current moment and the first moment satisfies a preset condition, and determines, based on a determining result, whether to send the data, so that it can be ensured that the sent data reaches the receive end device before the first moment, thereby further improving the reliability and effects of the embodiments of this application.

In S570, the core network device #D may obtain the data #θ and the information #D in the transmission layer.

For example, the core network device #D may perform, at the protocol layer #D, decapsulation on the received data packet #D, to obtain the data #θ and the information #D. The process may be similar to that in the prior art. Herein, to avoid repeated descriptions, detailed descriptions thereof are omitted.

In addition, the core network device #D may determine the moment #D based on the information #D, and deliver, at the moment #D, the data #θ from the transmission layer to the application layer, for example, a process or a thread corresponding to the application program #θ, so that the application program #θ can control the terminal device #D to perform the action corresponding to the data #θ.

It should be noted that, in the embodiments of this application, communication between the terminal device #D and the core network device #D may be performed through the access network device #D. A communications protocol (in other words, a protocol stack) used for communication between the core network device #D and the access network device #D may be different from a communications protocol (in other words, a protocol stack) used for communication between the terminal device #D and the access network device #D, so that the core network device #D can decapsulate (in other words, parse) a signal from the core network device #D (namely, a signal that satisfies a requirement of the communications protocol between the core network device #D and the access network device #D), and encapsulate obtained data or information into a signal that the terminal device #D can receive and identify (namely, a signal that satisfies a requirement of the communications protocol between the terminal device #D and the access network device #D).

It should be noted that, in this application, in S510, the terminal device #D may determine a period #D. By way of example but not limitation, the terminal device #D may determine the period #D based on the moment #D.

For example, duration of the period #D may be specified by a communications system or a communications protocol.

Alternatively, the duration of the period #D may be determined and indicated to the terminal device by a network device.

In addition, a location of the moment #D in the period #D may be specified by the communications system or the communications protocol.

Alternatively, the location of the moment #D in the period #D may be determined and indicated to the terminal device by the network device.

For example, the moment #D may be a starting moment of the period #D.

Alternatively, the moment #D may be an ending moment of the period #D.

Alternatively, the moment #D may be an intermediate moment of the period #D.

It should be noted that, in this application, in S550, the terminal device #D may further generate information #D based on the period #D, where the information #D can be used to determine the period #D.

For example, the information #D may be used to directly indicate the period #D. Specifically, the information #D indicates an absolute period, and the absolute period is the period #D. In this way, the access network device #D may directly determine the period #D based on the information #D.

For another example, the information #D may be used to indirectly indicate the period #D. Specifically, the information #D may be used to indicate duration #D, where the duration #D may be duration of an interval between a moment #L and a specified reference moment. The moment #L may be a moment specified in the period #D. For example, the moment #L may be a starting moment of the period #D, or the moment #L may be an ending moment of the period #L, or the moment #L may be an intermediate moment of the period #D. In this way, the moment #L can be determined (in other words, calculated) based on the reference moment and the duration #D, thereby determining the period #D.

It should be noted that, in S530, the terminal device #D may also determine a relationship between the current moment and the period #D.

For example, the terminal device #D may also determine duration (namely, another example of the duration #Z) of an interval between the current moment and a moment #M specified in the period #D and a preset duration threshold #D, and determine, based on a determining result, whether to perform operation S550.

For example, the moment #M may be a starting moment of the period #D.

Alternatively, the moment #M may be an ending moment of the period #D.

Alternatively, the moment #M may be an intermediate moment of the period #D.

In addition, when the information #D indicates the period #D, the core network device #D may further determine the period #D based on the information #D, and deliver the data #θ from the transmitter layer to the application layer in the period #D.

It should be noted that, the moment #M and the moment #L may be a same moment, or may be different moments. This is not particularly limited in this application.

In the prior art, the receive end device immediately sends, after receiving data, the received data to the application layer. Therefore, the transmission latency has great impact on a receiving moment, severely affecting a moment when the receive end device performs an action corresponding to the data. On the contrary, in the communication method provided in the embodiments of this application, the transmit end device determines the first moment, where the first moment is the first moment when the receive end device needs to deliver the first data to the application layer; and sends, to the receive end device, the first indication information used to indicate the first moment and the first data. In this way, the receive end device can be supported in determining the first moment based on the first indication information and delivering the first data to the application layer at the first moment. Therefore, the receive end device can be supported in performing an action corresponding to the first data in the application layer at the first moment, thereby preventing the transmission latency from affecting execution by the receive end device of an action corresponding to the data.

It should be understood that, the listed processed shown in FIG. 2 to FIG. 5 are merely examples for description, and the embodiments of this application are not limited thereto. For example, the communication method provided in the embodiments of this application may also be applied to D2D communication, M2M communication, or MTC communication. In addition, in the process, the protocol layer used for encapsulating data and information between two devices may change based on a requirement of the D2D communication, M2M communication, or MTC communication. Other additional processes may be similar to the processes shown in FIG. 2 to FIG. 5. Herein, to avoid repeated descriptions, detailed descriptions thereof are omitted.

Figure 6:
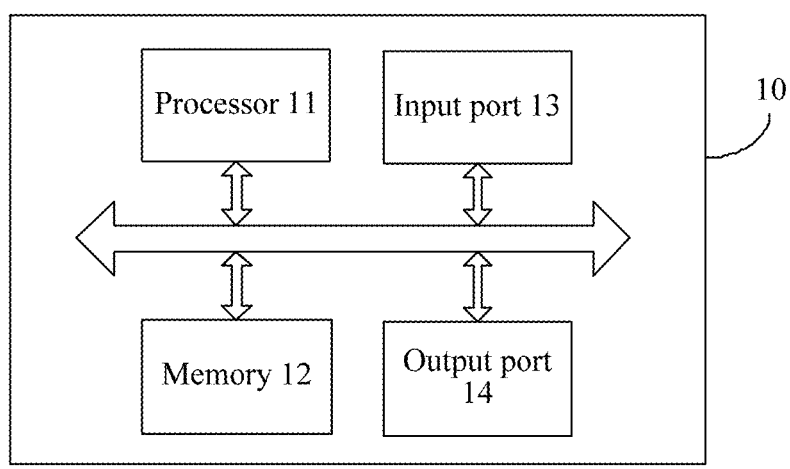
FIG. 6 is a schematic flowchart of an example of a communications apparatus according to an embodiment of this application.

According to the foregoing methods, FIG. 6 is a schematic diagram 1 of a communications apparatus 10 provided in the embodiments of this application. As shown in FIG. 6, the apparatus 10 may be a transmit end device (for example, the foregoing access network device #A, core network device #B, terminal device #C, or terminal device #D), or may be a chip or circuit, for example, a chip or circuit that may be disposed in a transmit end device.

The apparatus 10 may include a processor 11 (namely, an example of a processing unit) and a memory 12. The memory 12 is configured to store an instruction, and the processor 11 is configured to execute the instruction stored in the memory 12, to enable the apparatus 10 to implement operations performed by the transmit end device (for example, the foregoing access network device #A, core network device #B, terminal device #C, or terminal device #D) in the corresponding method shown in FIG. 2.

Further, the apparatus 10 may further include an input port 13 (namely, an example of a communications unit) and an output port 14 (namely, another example of the communications unit). Further, the processor 11, the memory 12, the input port 13 and the output port 14 may communicate with each other and transfer a control and/or data signal between each other by using an internal connection path. The memory 12 is configured to store a computer program. The processor 11 may be configured to invoke and run the computer program from the memory 12, thereby controlling the input port 13 to receive a signal and controlling the output port 14 to send a signal, to complete the operations of the terminal device in the foregoing methods. The memory 12 may be integrated in the processor 11, or may be disposed separately with the processor 11.

In one embodiment, if the apparatus 10 is a communications device, the input port 13 may be a receiver, and the output port 14 may be a transmitter. The receiver and the transmitter may be a same physical entity or different physical entities. If being a same physical entity, the receiver and the transmitter may be collectively referred to as a transceiver.

In one embodiment, if the apparatus 10 is a chip or a circuit, the input port 13 is an input interface, and the output port 14 is an output interface.

In one embodiment, if the apparatus 10 is a chip or a circuit, the apparatus 10 may alternatively not include the memory 12, and the processor 11 may read an instruction (a program or code) in a memory outside the chip, to implement the functions of the transmit end device in the corresponding methods shown in FIG. 2 to FIG. 5.

In one embodiment, functions of the input port 13 and the output port 14 may be considered to be implemented by using a transceiver circuit or a dedicated transceiver chip. The processor 11 may be considered to be implemented by using a dedicated processing chip, a processing circuit, a processor, or a general-purpose chip.

In one embodiment, it may be considered to implement the transmit end device provided in this embodiment of this application in a manner of using a general-purpose computer. That is, program code for implementing the functions of the processor 11, the input port 13, and the output port 14, is stored in the memory 12, and a general-purpose processor implements the functions of the processor 11, the input port 13, and the output port 14 by executing the code stored in the memory 12.

In the embodiments of this application, the processor 11 may be configured to determine a first moment, where the first moment is a moment when a receive end device needs to deliver first data to an application layer of the receive end device; and the output port 14 may be configured to send first indication information and the first data, where the first information is used to instruct the receive end device to deliver the first data to the application layer of the receive end device at the first moment.

In one embodiment, the first information includes indication information of the first moment.

In one embodiment, the first information includes indication information of first duration, where the first moment is a moment that a preset second moment reaches after the first duration.

In one embodiment, the second moment includes any one of the following moments:

a moment when the input port 13 receives the first data, and a moment when the output port 14 sends the first data.

In one embodiment, the transmit end device is an access network device, and the receive end device is a terminal device; or the transmit end device is a terminal device, and the receive end device is an access network device.

In one embodiment, the processor 11 may be configured to perform encapsulation on the first indication information and the first data in a first protocol layer, to generate a first data packet, where the first protocol layer includes at least one protocol layer of a physical PHY layer, a media access control (MAC) layer, a radio link layer control protocol RLC layer, and a packet data convergence protocol (PDCP) layer; and the output port 14 may be configured to send the first data packet to the receive end device.

In one embodiment, the transmit end device is a core network device, and the receive end device is a terminal device; or the transmit end device is a terminal device, and the receive end device is a core network device.

In one embodiment, the processor 11 may be configured to perform encapsulation on the first indication information and the first data in a non-access stratum NAS, to generate a second data packet; and the output port 14 may be configured to send the second data packet to the receive end device through an access network device.

In one embodiment, the processor 11 may be configured to determine second duration, where the second duration is duration between a current moment and the first moment; and configured to control, when determining that the second duration is greater than or equal to a preset first threshold, the output port 14 to send the first indication information and the first data.

In one embodiment, the first threshold is determined based on a data transmission latency between the transmit end device and the receive end device.

The listed functions and actions of the modules or units in the communications apparatus 10 are merely examples for description. The modules or units in the communications apparatus 10 may be configured to perform the actions or processes performed by the transmit end device (for example, the foregoing access network device #A, core network device #B, terminal device #C, or terminal device #D) in the foregoing methods.

For explanation and detailed description of concepts, and other operations related to the apparatus 10 and related to technical solutions provided in the embodiments of this application, refer to the foregoing methods or descriptions about the contents in other embodiments. Details are not described herein.

Figure 7:
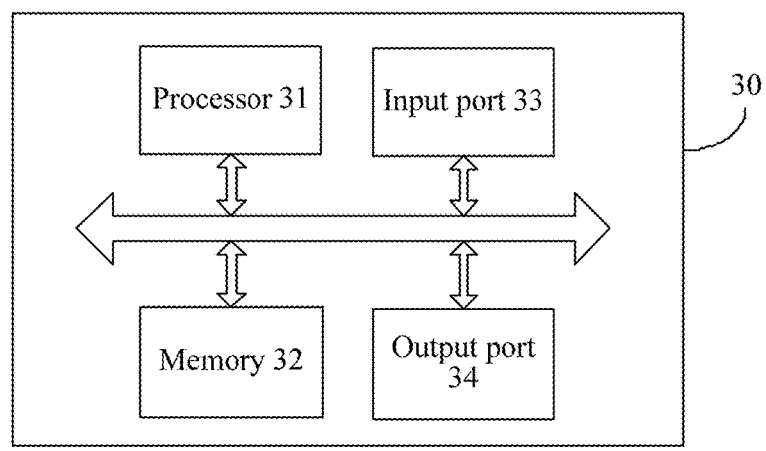
FIG. 7 is a schematic flowchart of another example of a communications apparatus according to an embodiment of this application.

According to the foregoing methods, FIG. 7 is a schematic diagram 2 of an apparatus 30 provided in the embodiments of this application and configured to perform communication. As shown in FIG. 7, the apparatus 30 may be a receive end device (for example, the foregoing terminal device #A, terminal device #B, access network device #C, or core network device #D), or may be a chip or circuit, for example, a chip or circuit that may be disposed in a receive end device.

The apparatus 30 may include a processor 31 (namely, an example of a processing unit) and a memory 32. The memory 32 is configured to store an instruction, and the processor 31 is configured to execute the instruction stored in the memory 32, to enable the apparatus 30 to implement operations performed by the receive end device (for example, the foregoing terminal device #A, terminal device #B, access network device #C, or core network device #D) in the corresponding methods shown in FIG. 2 to FIG. 5.

Further, the apparatus 30 may further include an input port 33 (namely, an example of a communications unit) and an output port 33 (namely, another example of the communications unit). Still further, the processor 31, the memory 32, the input port 33 and the output port 34 may communicate with each other and transfer a control and/or data signal between each other by using an internal connection path. The memory 32 is configured to store a computer program. The processor 31 may be configured to invoke and run the computer program from the memory 32, thereby controlling the input port 33 to receive a signal and controlling the output port 34 to send a signal, to complete the operations of the terminal device in the foregoing method 200. The memory 32 may be integrated in the processor 31, or may be disposed separately with the processor 31.

Therefore, the input port 33 is controlled to receive a signal, and the output port 34 is controlled to send a signal, to complete the operations of the receive end device in the foregoing methods. The memory 32 may be integrated in the processor 31, or may be disposed separately with the processor 31.

In one embodiment, if the apparatus 30 is a communications device, the input port 33 is a receiver, and the output port 34 is a transmitter. The receiver and the transmitter may be a same physical entity or different physical entities. If being a same physical entity, the receiver and the transmitter may be collectively referred to as a transceiver.

In one embodiment, if the apparatus 30 is a chip or a circuit, the input port 33 is an input interface, and the output port 34 is an output interface.

In one embodiment, if the apparatus 30 is a chip or a circuit, the apparatus 30 may alternatively not include the memory 32, and the processor 31 may read an instruction (a program or code) in a memory outside the chip, to implement the functions of the receive end device in the corresponding methods shown in FIG. 2 to FIG. 5.

In one embodiment, functions of the input port 33 and the output port 34 may be considered to be implemented by using a transceiver circuit or a dedicated transceiver chip. The processor 31 may be considered to be implemented by using a dedicated processing chip, a processing circuit, a processor, or a general-purpose chip.

In one embodiment, it may be considered to implement the receive end device provided in this embodiment of this application in a manner of using a general-purpose computer. That is, program code for implementing the functions of the processor 31, the input port 33, and the output port 34 is stored in the memory, and a general-purpose processor implements the functions of the processor 31, the input port 33, and the output port 34 by executing the code stored in the memory.

In the embodiments of this application, the input port 33 is configured to receive first indication information and first data, where the first indication information is used to instruct the receive end device to deliver the first data to the application layer of the receive end device at a first moment; and the processor 31 is configured to determine, based on the first indication information and a current moment, whether to deliver the first data to the application layer of the receive end device.

In one embodiment, if the current moment is before the first moment, the processor 31 delivers the first data to the application layer of the receive end device at the first moment.

In one embodiment, if the current moment is after the first moment, the processor 31 discards the first data.

In one embodiment, the first information includes indication information of the first moment.

In one embodiment, the first information includes indication information of first duration, where the first moment is a moment that a preset second moment reaches after the first duration, and the processor 31 is further configured to determine the first moment based on the second moment and the first duration.

In one embodiment, the second moment includes any one of the following moments:

a moment when the transmit end device receives the first data; and a moment when the transmit end device sends the first data packet.

In one embodiment, the transmit end device is an access network device, and the receive end device is a terminal device; or the transmit end device is a terminal device, and the receive end device is an access network device.

In one embodiment, the input port 33 is configured to receive a first data packet from the transmit end device; and the processor 31 is further configured to perform decapsulation on the first data packet in a first protocol layer, to obtain the first indication information and the first data, where the first protocol layer includes at least one protocol layer of a physical PHY layer, a media access control (MAC) layer, a radio link layer control protocol RLC layer, and a packet data convergence protocol (PDCP) layer.

In one embodiment, the transmit end device is a core network device, and the receive end device is a terminal device; or the transmit end device is a terminal device, and the receive end device is a core network device.

In one embodiment, the input port 33 is configured to receive a second data packet from the transmit end device by using an access network device; and the processor 31 is further configured to perform decapsulation on the second data packet in a non-access stratum NAS, to obtain the first indication information and the first data.

The listed functions and actions of the modules or units in the communications apparatus 30 are merely examples for description. The modules or units in the communications apparatus 30 may be configured to perform the actions or processes performed by the receive end device in the foregoing method 200. Herein, to avoid repeated descriptions, detailed descriptions thereof are omitted.

For explanation and detailed description of concepts, and other operations related to the apparatus 30 and related to technical solutions provided in the embodiments of this application, refer to the foregoing methods or descriptions about the contents in other embodiments. Details are not described herein.

Figure 8:
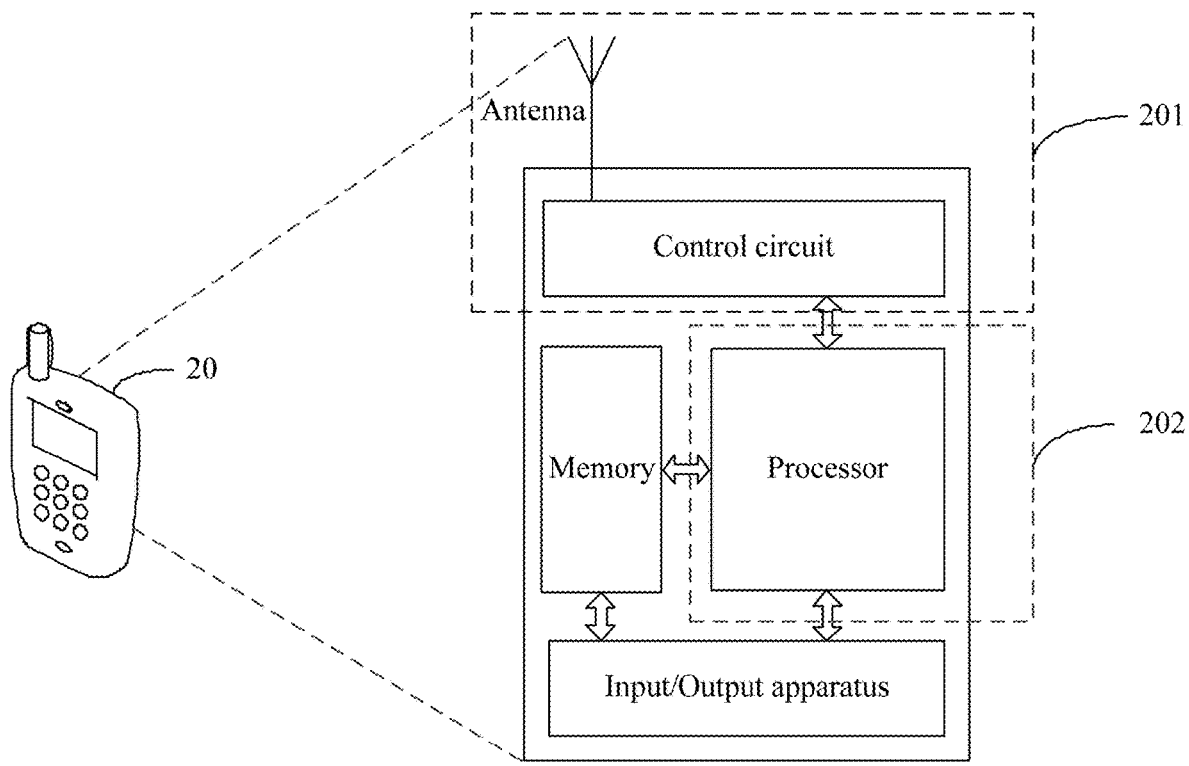
FIG. 8 is a schematic flowchart of an example of a terminal device according to an embodiment of this application.

FIG. 8 is a schematic structural diagram of a terminal device 20 provided in this application, and the terminal device 20 may be configured to implement the functions of the terminal device in the methods shown in FIG. 2 to FIG. 5. The terminal device 20 may be applied to the system shown in FIG. 1. For ease of description, FIG. 8 shows only main components of the terminal device. As shown in FIG. 8, the terminal device 20 includes: a processor, a memory, a control circuit, an antenna, and an input/output apparatus.

The processor is mainly configured to: process a communications protocol and communication data, control the entire terminal device, execute a software program, and process data of the software program, for example, is configured to support the terminal device to perform an action described in the foregoing method embodiments. The memory is mainly configured to store the software program and data, for example, the codebook described in the foregoing embodiments. The control circuit is mainly configured to: convert a baseband signal and a radio frequency signal, and process the radio frequency signal. The control circuit together with the antenna may also be referred to as a transceiver, mainly configured to receive and send a radio frequency signal in an electromagnetic wave form. The input/output apparatus, such as a touchscreen, a display, or a keyboard, is mainly configured to: receive data entered by a user and output data to the user.

After the terminal device is powered on, the processor may read the software program stored in the storage unit, explain and execute an instruction of the software program, and process the data of the software program. When data needs to be wirelessly sent, after performing baseband processing on the to-be-sent data, the processor outputs a baseband signal to a radio frequency circuit. After performing radio frequency processing on the baseband signal, the radio frequency circuit sends the radio frequency signal in a form of electromagnetic wave by using the antenna. When data is sent to the terminal device, the radio frequency circuit receives the radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 4 shows only one memory and one processor. In a real-world terminal device, there may be a plurality of processors and a plurality of memories. The memory may also be referred to as a storage medium, a storage device, or the like. This is not limited in this embodiment of this application.

In one embodiment, the processor may include a baseband processor and a central processing unit. The baseband processor is mainly configured to process a communications protocol and communication data. The central processing unit is mainly configured to: control the entire terminal device, execute a software program, and process data of the software program. The processor in FIG. 4 integrates functions of the baseband processor and the central processing unit. A person skilled in the art may understand that the baseband processor and the central processing unit may be respectively independent processors, and are interconnected by using technologies such as a bus. A person skilled in the art may understand that the terminal device may include a plurality of baseband processors, to adapt to different network standards. The terminal device may include a plurality of central processing units, to enhance a processing capability of the terminal device. Components of the terminal device may be connected to each other by using various buses. The baseband processor may also be represented as a baseband processing circuit or a baseband processing chip. The central processing unit may also be represented as a central processing circuit or a central processing chip. A function of processing the communications protocol and the communication data may be set in the processor, or may be stored in the storage unit in a software program form. The processor executes the software program, to implement a baseband processing function.

For example, in the embodiments of this application, the antenna having a receiving and transmission function, and the control circuit may be viewed as a transceiver unit 201 of the terminal device 20. The processor having a processing function may be viewed as a processing unit 202 of the terminal device 20. As shown in FIG. 8, the terminal device 20 includes a transceiver unit 201 and a processing unit 202. The transceiver unit may also be referred to as a transceiver, a transceiver machine, a transceiver apparatus, and the like. In one embodiment, a component for implementing a receiving function in the transceiver unit 201 may be considered as a receiving unit, and a component for implementing a sending function in the transceiver unit 201 may be considered as a sending unit, that is, the transceiver unit 201 includes a receiving unit and a sending unit. For example, the receiving unit may also be referred to as a receiver machine, a receiver, a receiver circuit, and the like. The sending unit may also be referred to as a transmitter machine, a transmitter, a transmitter circuit, and the like.

Figure 9:
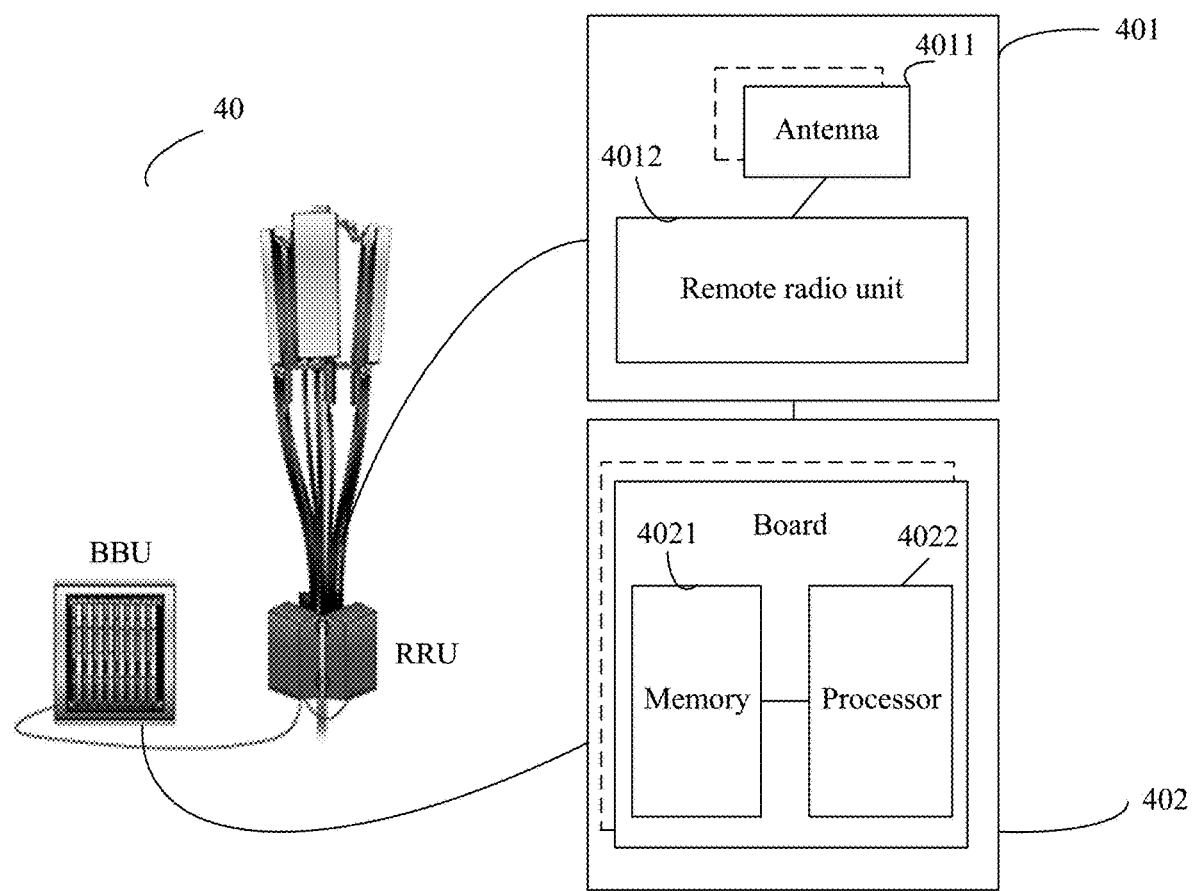
FIG. 9 is a schematic flowchart of another example of an access network device according to an embodiment of this application.

FIG. 9 is a schematic structural diagram of an access network device provided in the embodiments of this application, and the access network device may be configured to implement the functions of the access network device in the methods shown in FIG. 2 to FIG. 5. For example, FIG. 9 may be a schematic structural diagram of a base station. As shown in FIG. 9, the access network device (for example, the base station) may be applied to the system shown in FIG. 1. The access network device 40 includes one or more radio frequency units, such as a remote radio unit (RRU) 401 and one or more baseband units (BBU) (also referred to as digital unit, digital unit, DU) 402. The RRU 401 may be referred to as a transceiver unit, a transceiver machine, a transceiver circuit, a transceiver, or the like, and may include at least one antenna 4011 and a radio frequency unit 4012. The RRU 401 is mainly configured to: receive and send a radio frequency signal, and perform conversion between a radio frequency signal and a baseband signal, and for example, is configured to send the signaling message described in the foregoing embodiments to terminal device. The BBU 402 is mainly configured to perform baseband processing, control the base station, and the like. The RRU 401 and the BBU 402 may be physically disposed together, or may be physically separately disposed, that is, a distributed base station.

The BBU 402 is a control center of the base station, and is also referred to as a processing unit, mainly configured to complete a baseband processing function, for example, channel coding, multiplexing, modulation, and spectrum spreading. For example, the BBU (the processing unit) 402 may be configured to control the base station 40 to perform an operation procedure related to a network device in the foregoing method embodiments.

In an example, the BBU 402 may include one or more boards. Multiple boards may jointly support a radio access network (for example, an LTE network or a 5G system) of a single access standard, or may respectively support radio access networks of different access standards. The BBU 402 further includes a memory 4021 and a processor 4022. The memory 4021 is configured to store a necessary instruction and necessary data. For example, the memory 4021 stores a codebook and the like in the foregoing embodiments. The processor 4022 is configured to control the base station to perform a necessary action, and for example, is configured to control the base station to perform an operation procedure related to a network device in the foregoing method embodiments. The memory 4021 and the processor 4022 may serve one or more boards. That is, the memory and the processor may be disposed individually on each board. Alternatively, a plurality of boards may share the same memory and the same processor. In addition, a necessary circuit may be disposed on each board.

In one embodiment, with development of system-on-chip (SoC) technologies, some or all of functions of the 402 part and the 401 part may be implemented by using the SoC technology such as a base station function chip. The base station function chip is integrated with devices such as a processor, a memory, and an antenna interface, a program of a base station-related function is stored in the memory, and the program is executed by the processor to implement the base station-related function. In one embodiment, the base station function chip can also read a memory outside the chip to implement the base station-related function.

It should be understood that, the structure of the access network device shown in FIG. 9 is merely a possible form, and should not constitute any limitation to the embodiments of this application. In this application, the possibility that a base station structure of another form may appear in the future is not excluded.

According to the methods provided in the embodiments of this application, an embodiment of this application further provides a communications system, including the foregoing transmit end device and receive end device.

It should be understood that, the processor in the embodiments of this application may be a central processing unit (CPU), or may further be another general purpose processor, a digital signal processor (DSP), an application specific integrated circuit (ASIC), a field programmable gate array (FPGA), or another programmable logical device, discrete gate or transistor logical device, discrete hardware component, or the like. The general purpose processor may be a microprocessor, or the processor may be any conventional processor or the like.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of random access memory (RAM) RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

All or some of the foregoing embodiments may be implemented by means of software, hardware, firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the embodiments of this application.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the embodiment goes beyond the scope of this application. It may be clearly understood by a person skilled in the art that, for the purpose of convenient and brief description, for a detailed working process of the foregoing system, apparatus, and unit, refer to a corresponding process in the foregoing method embodiments, and details are not described herein again. In the several embodiments provided in this application, it should be understood that the disclosed system, apparatus, and method may be implemented in other manners. For example, the described apparatus embodiment is merely an example. For example, the unit division is merely logical function division and may be other division in some embodiments. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments. In addition, functional units in the embodiments of this application may be integrated into one processing unit, or each of the units may exist alone physically, or two or more units are integrated into one unit. When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a removable hard disk, a read-only memory, a random access memory, a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   determining, by a transmit end device, a first moment, wherein the first moment is a moment when a receive end device needs to deliver first data to an upper layer of a communications protocol layer of the receive end device; and
   sending, by the transmit end device, first indication information and the first data to the receive end device, wherein the first indication information is used to instruct the receive end device to deliver the first data to the upper layer of the communications protocol layer of the receive end device at the first moment, wherein the sending, by the transmit end device, first indication information and the first data comprises determining, by the transmit end device, second duration, wherein the second duration is duration between a current moment and the first moment; and sending, by the transmit end device when determining that the second duration is greater than or equal to a preset first threshold, the first indication information and the first data.

2. The communication method according to claim 1, wherein the first indication information comprises indication information of the first moment.

3. The communication method according to claim 1, wherein the first indication information comprises indication information of a first duration, wherein:
   the first moment is a moment that a preset second moment reaches after the first duration.

4. The communication method according to claim 3, wherein the second moment is a moment when the transmit end device receives the first data, or a moment when the transmit end device sends the first data.

5. A communication method, comprising:
   receiving, by a receive end device, first indication information and first data, wherein the first indication information is used to instruct the receive end device to deliver the first data to an upper layer of a communications protocol layer of the receive end device at a first moment; and
   sending, by the receive end device, the first data to the upper layer of the communications protocol layer of the receive end device at the first moment, if a current moment is before the first moment or the current moment is the first moment; and
   discarding, by the receive end device, the first data, if the current moment is after the first moment.

6. The communication method according to claim 5, wherein the first indication information comprises indication information of the first moment.

7. The communication method according to claim 5, wherein the first indication information comprises indication information of a first duration, wherein:
   the first moment is a moment that a preset second moment reaches after the first duration; and the communication method further comprises: determining, by the receive end device, the first moment based on the second moment and the first duration.

8. A communications apparatus, comprising:
a storage medium including executable instructions and a processor, wherein the executable instructions, when executed by the processor, cause the apparatus to:
   determine a first moment, wherein the first moment is a moment when a receive end device needs to deliver first data to an upper layer of a communications protocol layer of the receive end device; and
send first indication information and the first data, wherein the first indication information is used to instruct the receive end device to deliver the first data to the upper layer of the communications protocol layer of the receive end device at the first moment, wherein the executable instructions, when executed by the processor, further cause the apparatus to:
determine a second duration, wherein the second duration is duration between a current moment and the first moment; and
send, when determining that the second duration is greater than or equal to a preset first threshold, the first indication information and the first data.

9. The communications apparatus according to claim 8, wherein the first indication information comprises indication information of the first moment.

10. The communications apparatus according to claim 8, wherein the first indication information comprises indication information of a first duration, wherein:
   the first moment is a moment that a preset second moment reaches after the first duration.

11. The communications apparatus according to claim 10, wherein the second moment is a moment when a communications unit receives the first data, or a moment when the communications unit sends the first data.

12. A communications apparatus, comprising:
a storage medium including executable instructions and a processor, wherein the executable instructions, when executed by the processor, cause the apparatus to:
receive first indication information and first data from a transmit end device, wherein the first indication information is used to instruct the apparatus to deliver the first data to an upper layer of a communications protocol layer of the apparatus at a first moment; and
send, the first data to the upper layer of the communications protocol layer of the apparatus, if a current moment is before the first moment or the current moment is the first moment and discard the first data, if the current moment is after the first moment.

13. The communications apparatus according to claim 12, wherein the first indication information comprises indication information of the first moment.

14. The communications apparatus according to claim 12, wherein the first indication information comprises indication information of a first duration, wherein:
   the first moment is a moment that a preset second moment reaches after the first duration; and the processor is further configured to determine the first moment based on the second moment and the first duration.

* * * * *